US009236748B2

(12) United States Patent
Barsukov et al.

(10) Patent No.: US 9,236,748 B2
(45) Date of Patent: Jan. 12, 2016

(54) METHOD AND APPARATUS OF CHARGING THE BATTERY WITH GLOBALLY MINIMIZED INTEGRAL DEGRADATION POSSIBLE FOR PREDEFINED CHARGING DURATION

(71) Applicant: Texas Instruments Incorporated, Dallas, TX (US)

(72) Inventors: Yevgen Barsukov, Richardson, TX (US); Sai Bun Samuel Wong, Irving, TX (US); Brian Alongi, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 257 days.

(21) Appl. No.: 14/014,195

(22) Filed: Aug. 29, 2013

(65) Prior Publication Data

US 2014/0062415 A1    Mar. 6, 2014

Related U.S. Application Data

(60) Provisional application No. 61/695,159, filed on Aug. 30, 2012.

(51) Int. Cl.
*H02J 7/00* (2006.01)
*H02J 7/04* (2006.01)
*H01M 10/052* (2010.01)
*H01M 10/48* (2006.01)

(52) U.S. Cl.
CPC ............... *H02J 7/00* (2013.01); *H02J 7/0008* (2013.01); *H02J 7/045* (2013.01); *H02J 7/047* (2013.01); *H01M 10/052* (2013.01); *H01M 10/48* (2013.01)

(58) Field of Classification Search
CPC .................................. H02J 7/00; H02J 7/0008
USPC .......................................................... 320/134
See application file for complete search history.

(56) References Cited

U.S. PATENT DOCUMENTS

| 2009/0228225 A1 | 9/2009 | Burgess |
| 2011/0196633 A1 | 8/2011 | Abe et al. |

FOREIGN PATENT DOCUMENTS

| JP | 2008042960 | 2/2008 |
| JP | 2012037464 | 2/2012 |
| KR | 1020110111018 | 10/2011 |

OTHER PUBLICATIONS

PCT Search Report mailed Dec. 19, 2013.
English Machine Translation of JP2012037464.
English Machine Translation of KR1020110111018.
English Machine Translation of JP2008042960.

*Primary Examiner* — Sun Lin
(74) *Attorney, Agent, or Firm* — William B. Kempler; Frank D. Cimino

(57) ABSTRACT

An apparatus and method for charging a battery with an improved charging performance and a reduced degradation of the battery. A battery charging profile is configured to achieve a minimal degradation of a selected battery possible for a given charge time. A minimization is achieved using battery degradation modeling data indicative of a battery degradation level of a selected battery, and voltage and temperature response modeling data indicative of a predicted battery voltage and a predicted battery temperature of the selected battery as a function of time and charging current.

28 Claims, 22 Drawing Sheets

METHOD AND APPARATUS OF CHARGING THE BATTERY WITH GLOBALLY MINIMIZED INTEGRAL DEGRADATION POSSIBLE FOR PREDEFINED CHARGING DURATION

CROSS-REFERENCE TO RELATED APPLICATIONS

This application claims priority to U.S. Provisional Patent Application Ser. No. 61/695,159 filed on Aug. 30, 2012. The content of the above-identified patent document is incorporated herein by reference.

TECHNICAL FIELD

The present application relates generally to battery charging, including charging profiles.

BACKGROUND

Traditionally, battery charging algorithms have been optimized to achieve minimal possible charging time given the available current of an AC adaptor. A constant current/constant voltage (CC/CV) charging method satisfies this criteria. However, in many cases, charging in a minimal charging time brings no significant benefit to the application, while using a pre-defined acceptable charging time would be sufficient. In addition, minimizing the charging time has detrimental effects on the battery aging rate, because of the high temperature, high voltage and/or lithium plating periods that coincide in traditional CC/CV charging which accelerate battery degradation.

Previous attempts to reduce battery aging during charging were focused on some isolated factors affecting degradation, for example, by reducing charging voltage. Some attempts to make optimization of multiple parameters are not based on a realistic model of battery aging that is conformed and refined using empirical data, and are not based on full battery characterization data that assures accurate voltage and temperature modeling under arbitrary conditions. Some of the degradation models need access to detailed information about battery cell chemistry and composition and are therefore not practical for mass adoption that requires standardization of obtaining the parameters. There has not been a solution that finds all the conditions that guaranty absolute minimum degradation.

There is desired a solution that provides a charge profile creating minimal battery degradation for a given charging time and a maximal AC adaptor power, and provides improved battery life.

SUMMARY

An apparatus and method for charging a battery with improved charging performance and reduced degradation of the battery. A battery charging profile is configured to achieve minimal degradation of a selected battery possible for a given charge time. The minimization is achieved using battery degradation modeling data indicative of a battery degradation rate of a selected battery under given conditions, and voltage and temperature response modeling data indicative of predicted battery voltage and predicted temperature of the selected battery as a function of time and charging current.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
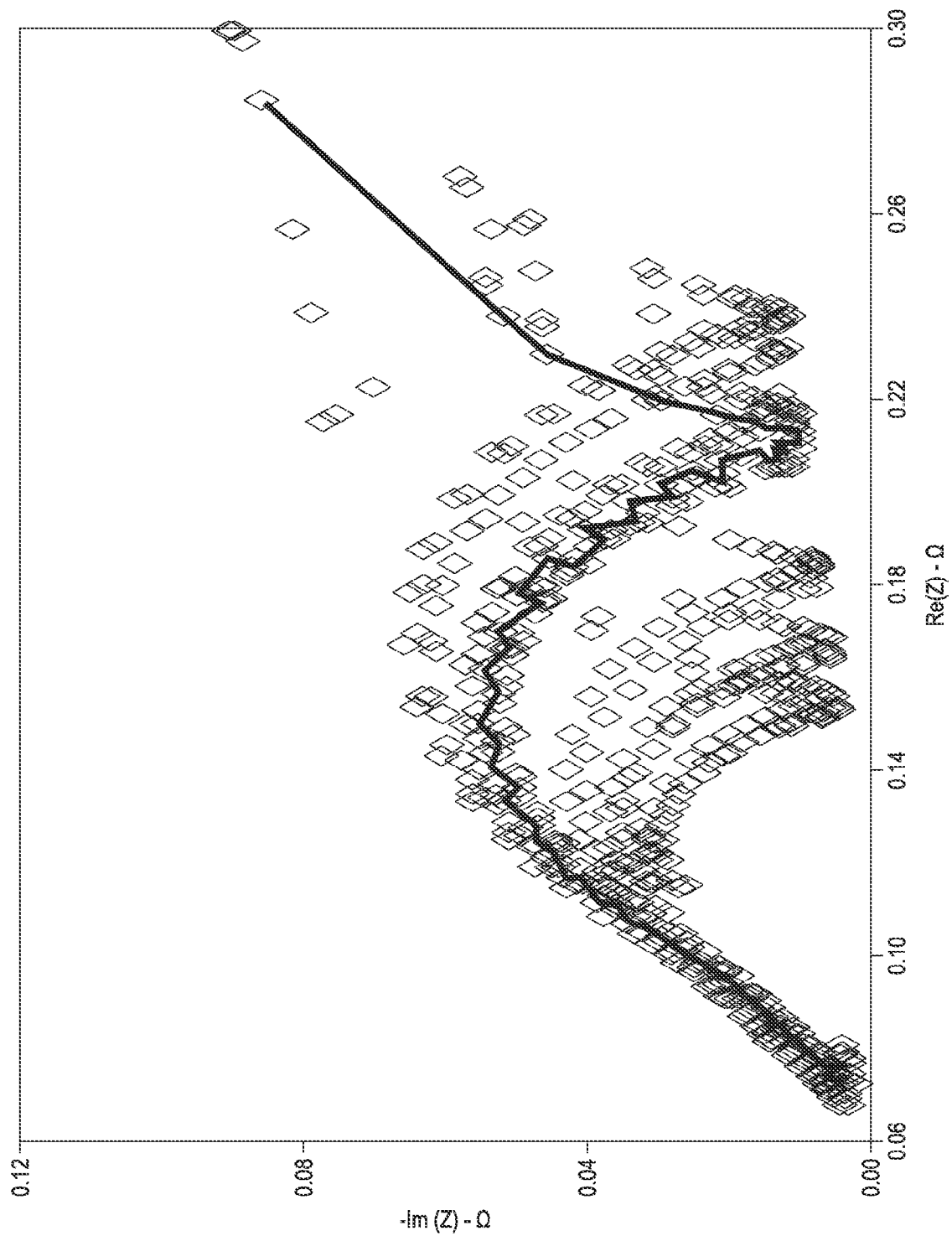
FIG. 1 and FIG. 2 illustrate the effects of battery degradation.

FIGS. 1 through 25, discussed below, and the various embodiments used to describe the principles of the present disclosure in this patent document are by way of illustration only and should not be construed in any way to limit the scope of the disclosure.

The invention improves battery aging, and also finds the best (minimal integral degradation) charging profile possible for a given charging time, system environment and battery properties. It is based on an aging model that is refined using experimental data of calendar life and cycling degradation which gives sufficient level of detail to see degradation at every moment of the charging and integrate these values to find integral degradation. The aging model parameters can be obtained directly from empirical degradation data so there is no need to know the details of each battery composition, which allows quick and automated support of cells from different vendors. The modeling of battery voltage, current and temperature is done using parameters obtained from actual cell characterization which is automated and is already widely adopted and tested in the field. Additional update of impedance and capacity parameters happens inside the system itself, which allows accounting for cell to cell deviation and changes due to battery aging.

This invention provides an apparatus and method that significantly extends battery life through using the charging with minimized degradation for each particular charging time, battery properties and external conditions. It is achieved by:

1) Means to model battery voltage, temperature and current during charging under predefined charging conditions given battery internal parameters (impedance profile, voltage profile, thermal properties) and external parameters such as system temperature;

2) Means to model battery degradation rate as a function of voltage, temperature, current and time based on degradation functions obtained from battery degradation data during storage at fixed temperature and voltage, degradation data obtained during battery cycling, and lithium-plating modeling based on impedance spectra and voltage measurements on the battery;

3) Combination of means in 1) and 2) to obtain a integral degradation and charging time of a battery during one cycle with predefined charging parameters;

4) An optimization system that finds a set of charging parameters that minimizes the integral degradation for one cycle and minimizes deviation from pre-defined charge time;

5) Means to measure present battery parameters (impedance profile, capacity) to account for cell to cell deviation and battery aging as well as to measure external system parameters such as temperature;

6) A system that employs the charging parameters that assures minimal degradation for present set of battery parameters and external parameters to control charging current and/or charging voltage to achieve actual charging of the battery that minimizes its degradation and completes charging in pre-defined time.

The present invention comprises a method and apparatus for charging a battery with globally minimized integral degradation possible for a predefined charging duration. The invention includes battery degradation modeling, battery current response modeling, and provides multi-level charging (MLC) optimized using battery modeling framework. The invention processes degradation mechanisms, degradation kinetics, degradation rate modeling functions, and function parameters from experimental data.

Figure 2:
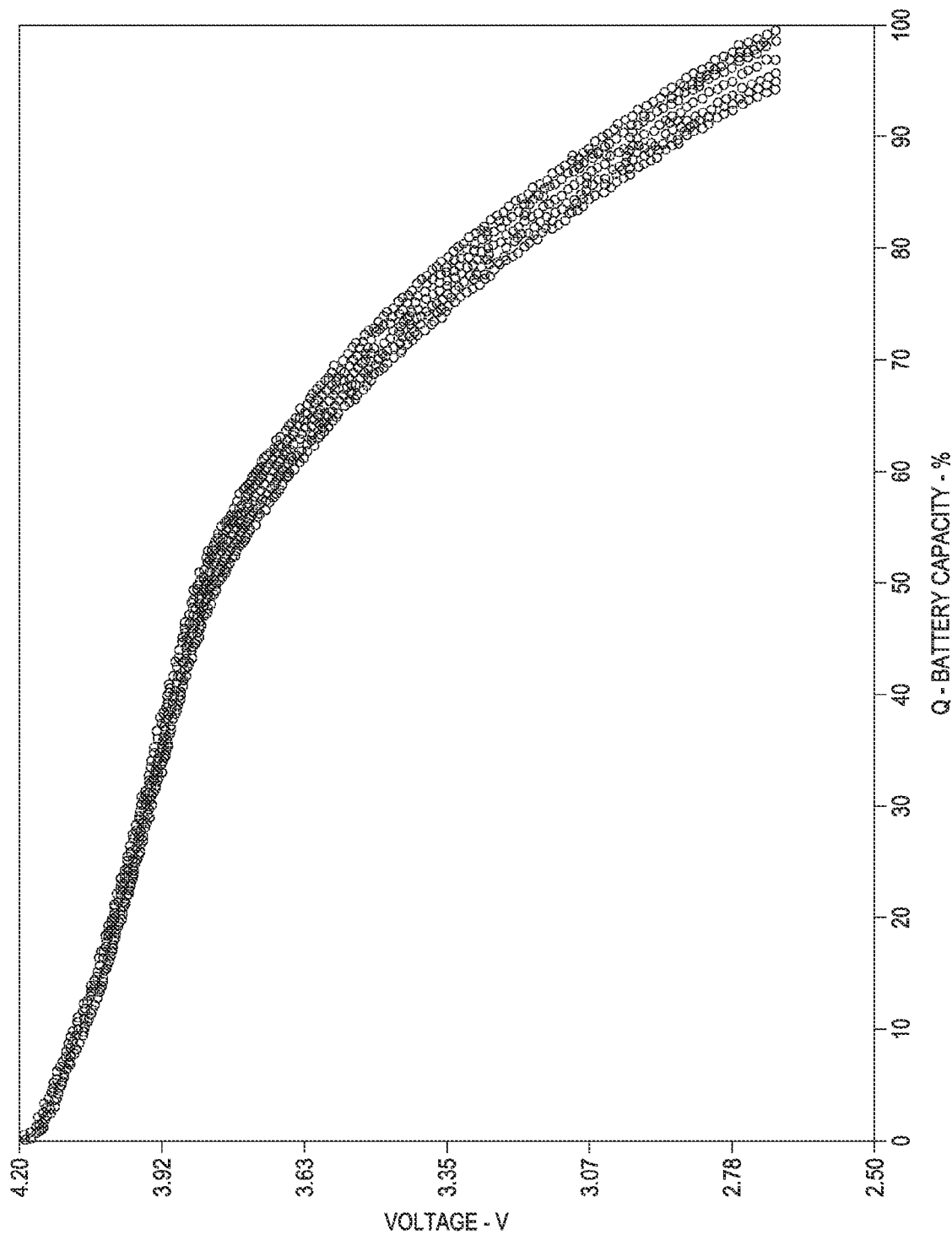

Two principle effects of battery degradation are active material loss which creates chemical capacity loss, and impedance increase with creates usable capacity loss. At 100 cycles, impedance typically increases by 70% compared to a new battery as shown in FIG. 1. At the same 100 cycles, chemical capacity decreases by 5% as can be seen in FIG. 2 from a low rate discharge test (10 hr. rate).

Figure 3:
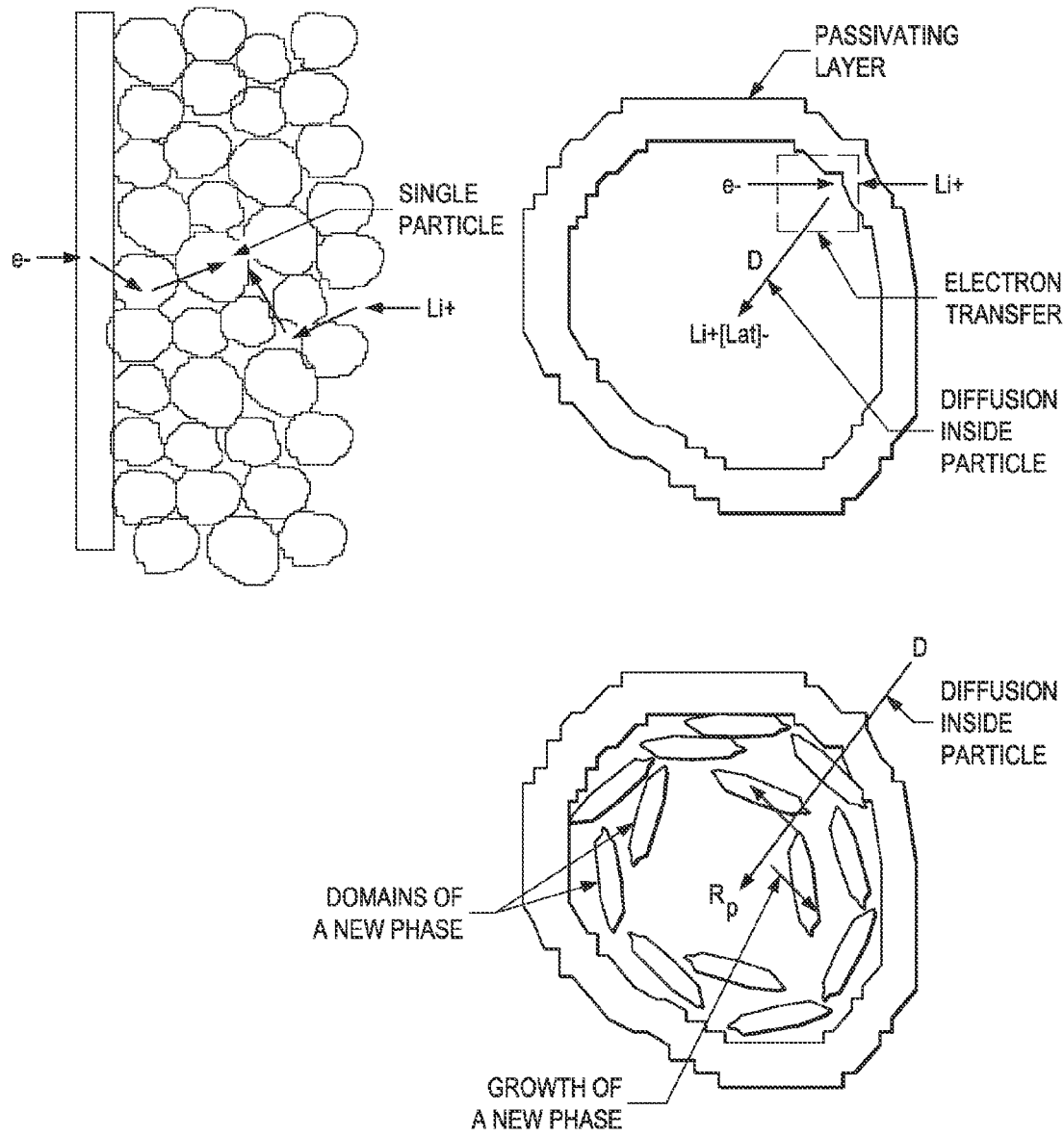
FIG. 3 and FIG. 4 illustrate components of battery impedance.
Figure 4:
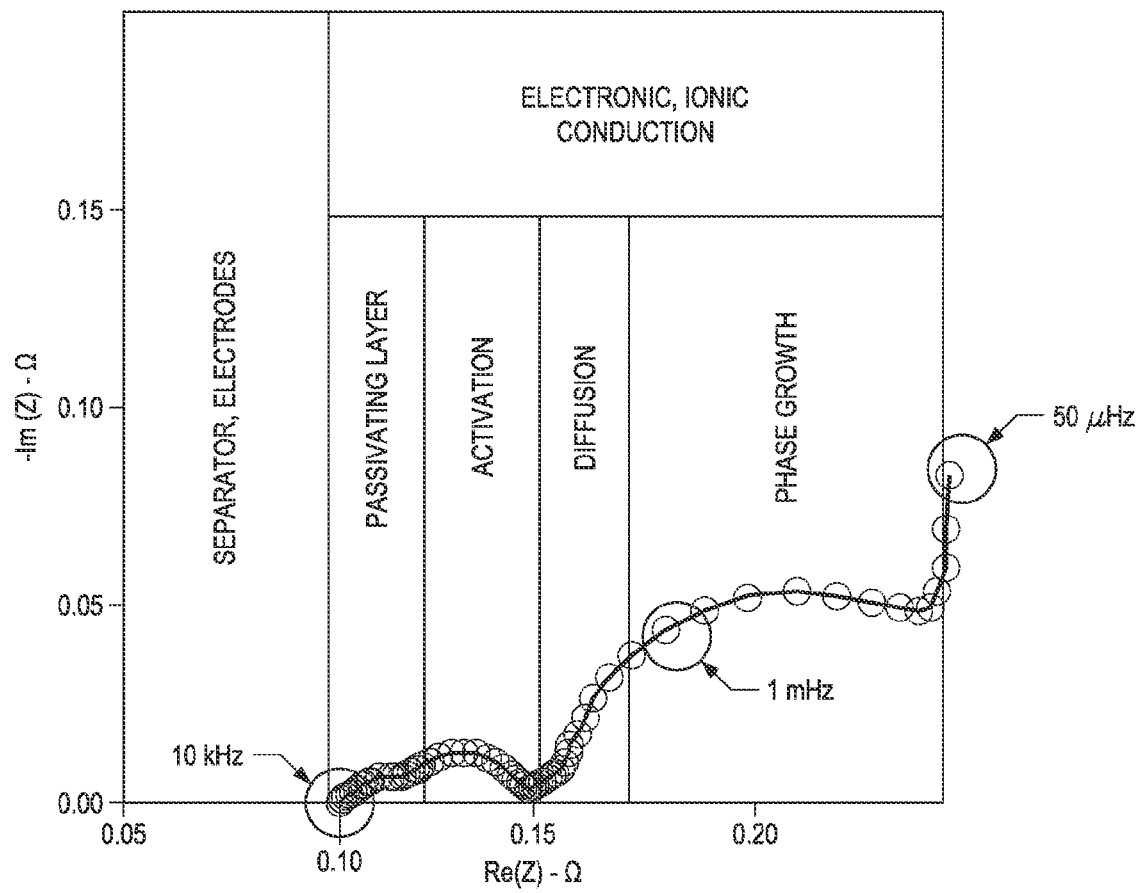
Figure 6:
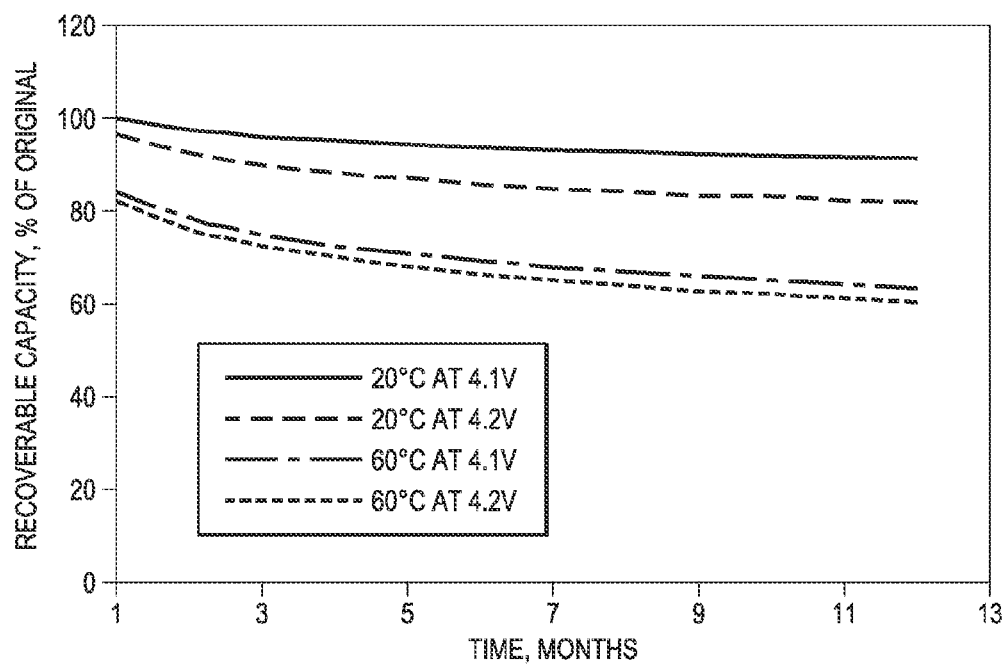
FIG. 6 illustrates fitting multiple voltages/temperature storage degradation data.
Figure 5:
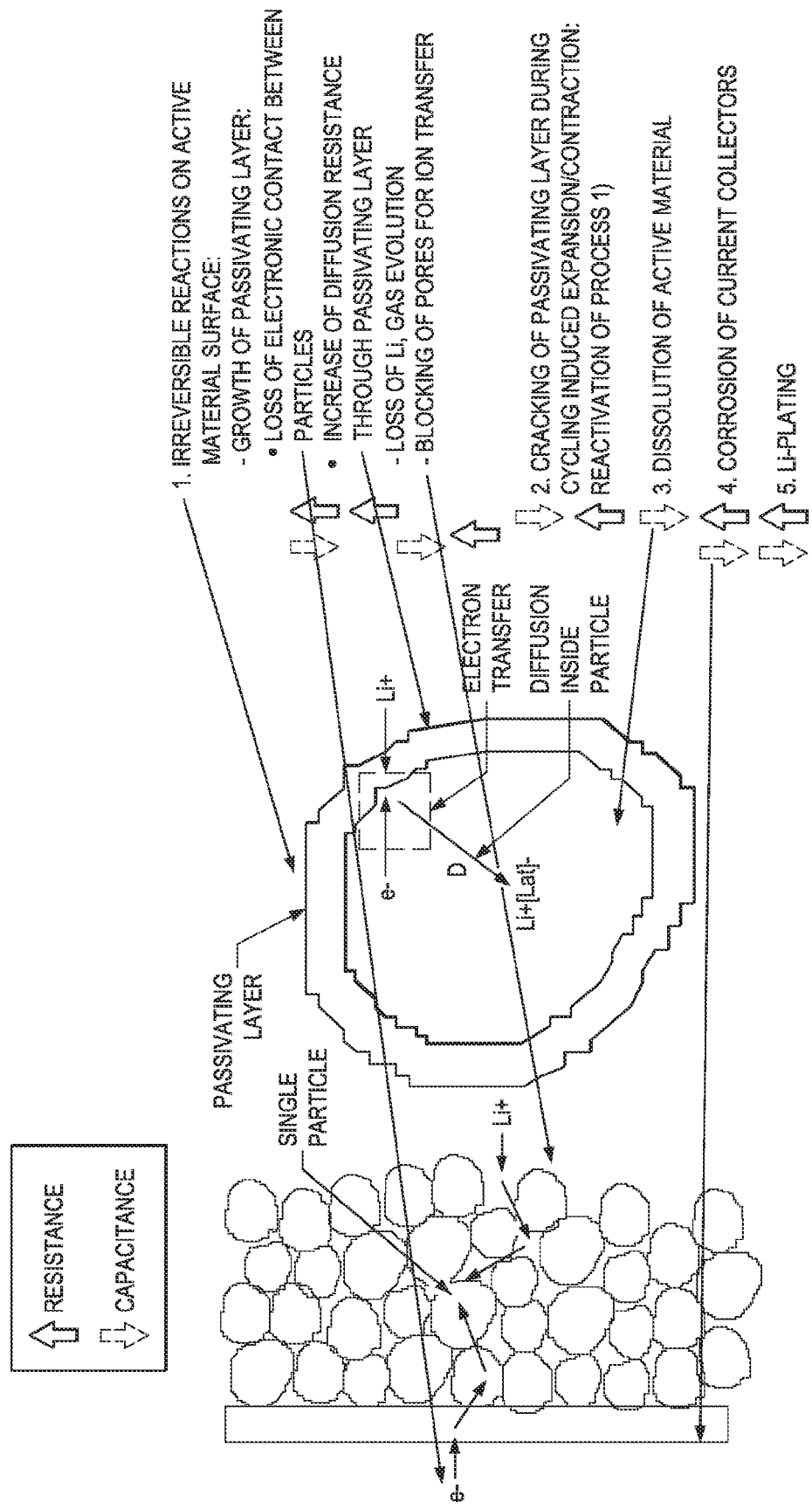
FIG. 5 illustrates the main degradation processes, and the effects on battery impedance Z and capacity Q.

There are several main components affecting battery impedance. The kinetic steps in a Li-Ion battery are shown in FIG. 3, and a corresponding impedance spectrum is shown in FIG. 4. The main degradation processes are shown in FIG. 5, including the effects of increased impedance Z and lower capacity Q. This includes irreversible reactions on an active material surface including growth of the passivating layer, loss of lithium due to gas evolution, and blocking of pores for ion transfer. Cracking of the passivating layer during cycling induces expansion/contraction, dissolution of active material, corrosion of current collectors and Li-plating all have these negative effects.

Factors accelerating the battery degradation rate include:
voltage (charge transfer rate); affects: storage, cycling
temperature (both charge transfer and diffusion rate); affects: storage, cycling
passed charge (cracking of passivating layer, reducing diffusion length; affects: cycling
Li-plating; affects: charging at elevated rates or low temperatures.

Factors decreasing the battery degradation rate include:
Time passed for passivating layer formation (increase of diffusion length; affects: storage Referring to FIG. 6, there is shown the fit of the storage full charge capacity (FCC) degradation data to find the parameters of storage degradation function. The parameters include:

Degradation rate factors for each condition, for example 4.1 V, 4.2V, 20 C and 60 C.

Time constant of rate-decay factor due to growth of passivating layer.

Figure 7:
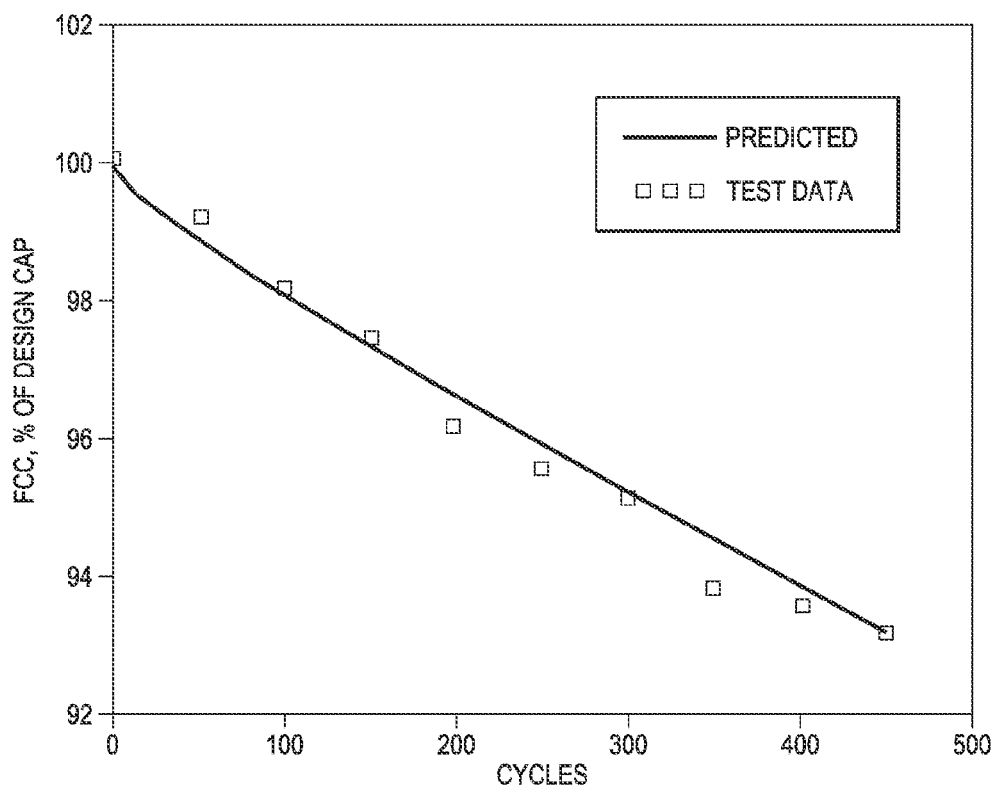
FIG. 7 illustrates fitting long cycling data to find cycling degradation due to cracking of a passivation layer.

FIG. 7 shows the fitting of long cycling data to find passed charged correction due to cracking of the passivation layer. Passed charge is defined as the amount of coulombs passed during present charging or discharging of the battery. The fitting of the long cycling data to the overall degradation function includes the effects of battery temperature (T), battery voltage (V), time and charge enables finding parameters of degradation acceleration due to cracking of the passivation layer. The parameters include charge acceleration factor of degradation. The overall parameter set describes both storage degradation and cycling degradation accurately.

Figure 8:
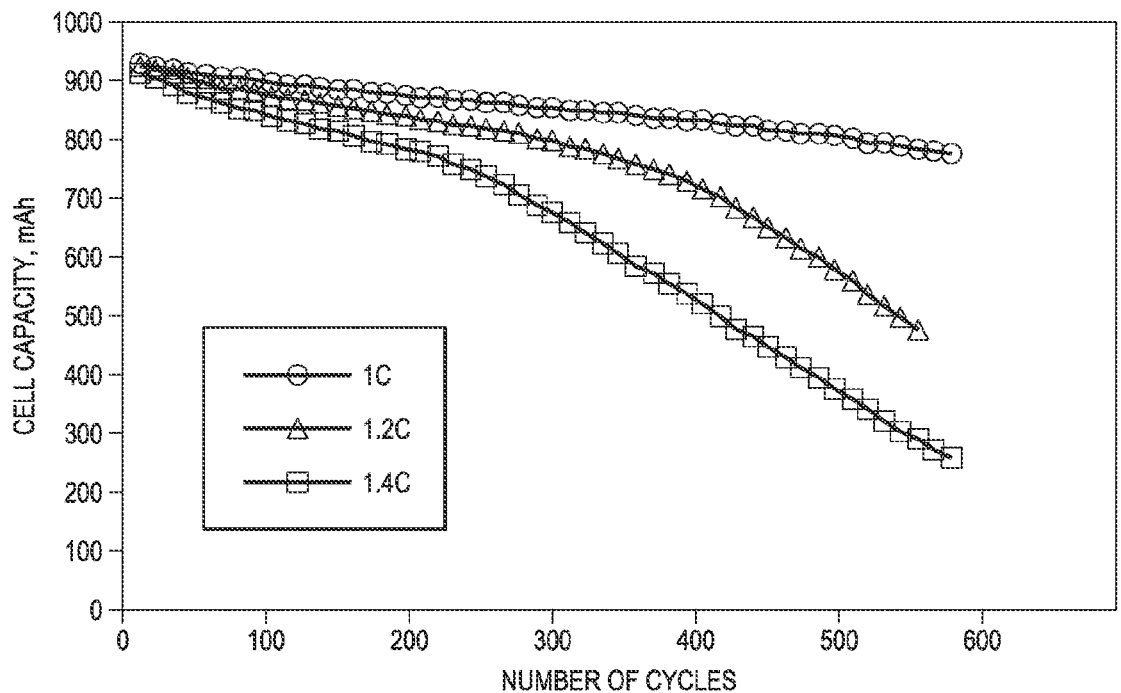
FIG. 8 illustrates additional degradation at high current charging.

There is additional degradation at high rate charging, and the temperature effect is not enough to explain it. Testing at a high charge rate and the same temperature indicates increased degradation. Modeling that considers increased temperature during charge does not allow such a large increase. FIG. 8 shows the effect of charge rate on cycle performance. Test cells charged at constant current of various rates to 4.2V followed by CV float charging at 4.2V for 2.5 hr. and then discharged to 2.75 V at 1 C rate. Periods of CV float charging for 1, 1.2, and 1.4 rates are 100, 110 and 117 minutes, respectively.

Figure 9:
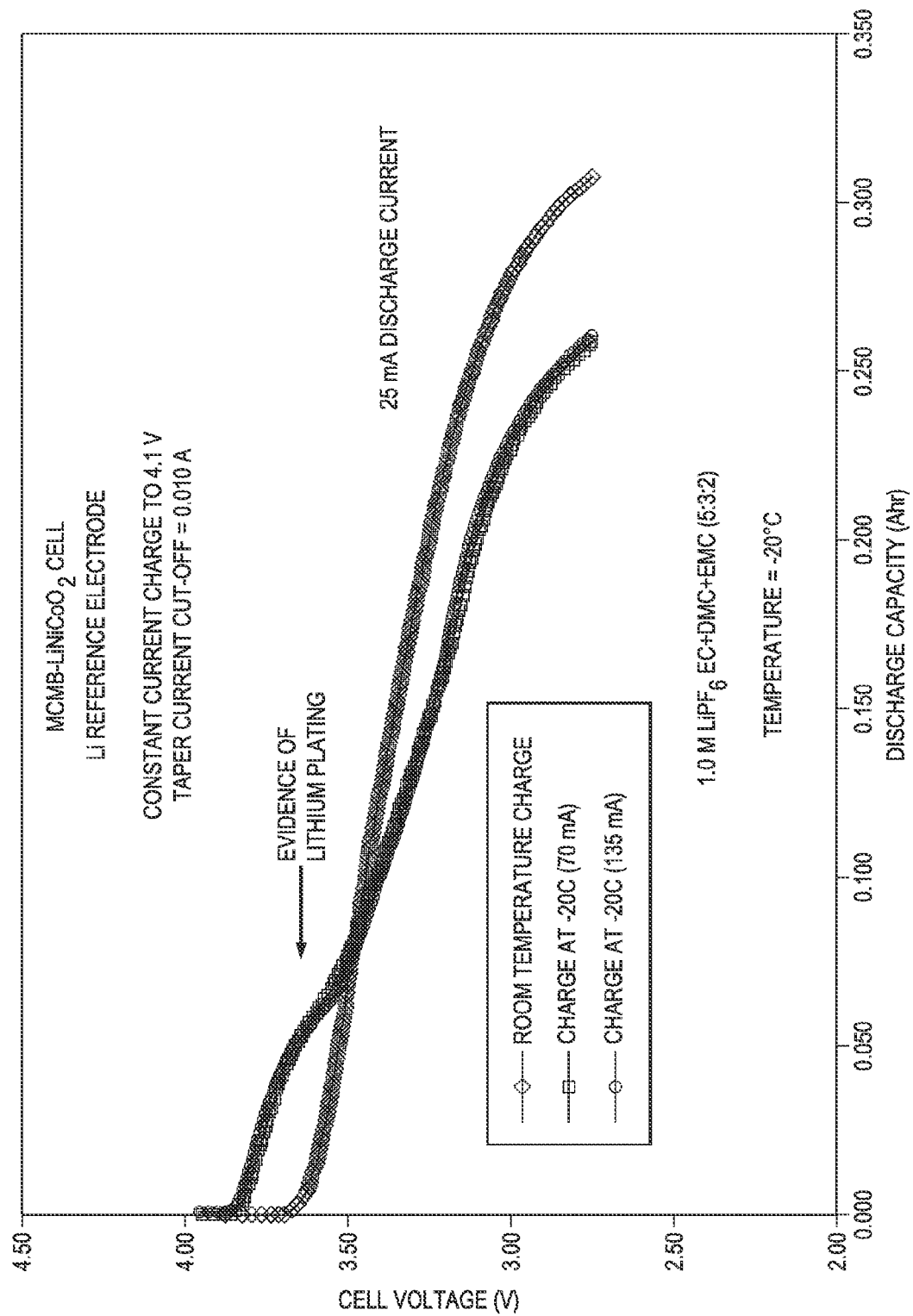
FIG. 9 illustrates Li-plating degradation.
Figure 10:
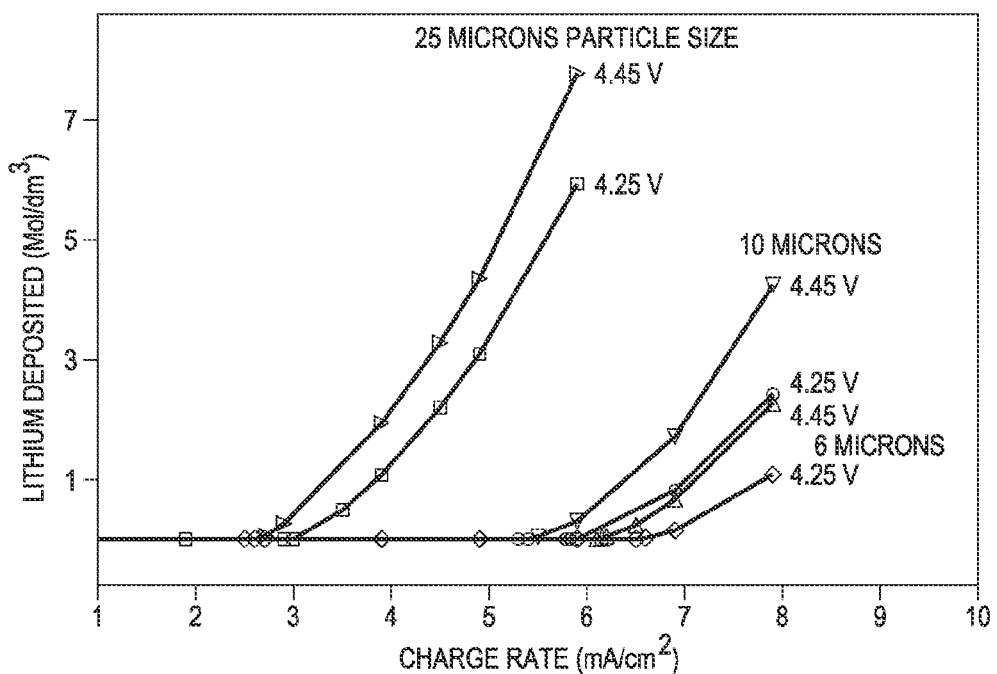
FIG. 10 illustrates modeling of LI-deposition dependent on active material particle size.

Referring to FIG. 9, there is illustrated the cause of additional battery degradation, Li-plating. FIG. 10 shows the modeling of Li-deposition, illustrating that at unusually high charge rates, Li-plating can take place even at room temperature. The plating depends on the particle size of anode material, conductivity of electrolyte and pores and state of charge. FIG. 10 illustrates the amount of lithium deposited as a function of charge rate for different particle sizes MCMB 628, 1028, and 2528) for graphite negative electrodes. The cells have a 5% excess negative electrode and the results are shown at the negative electrode/separator interface.

Figure 11:
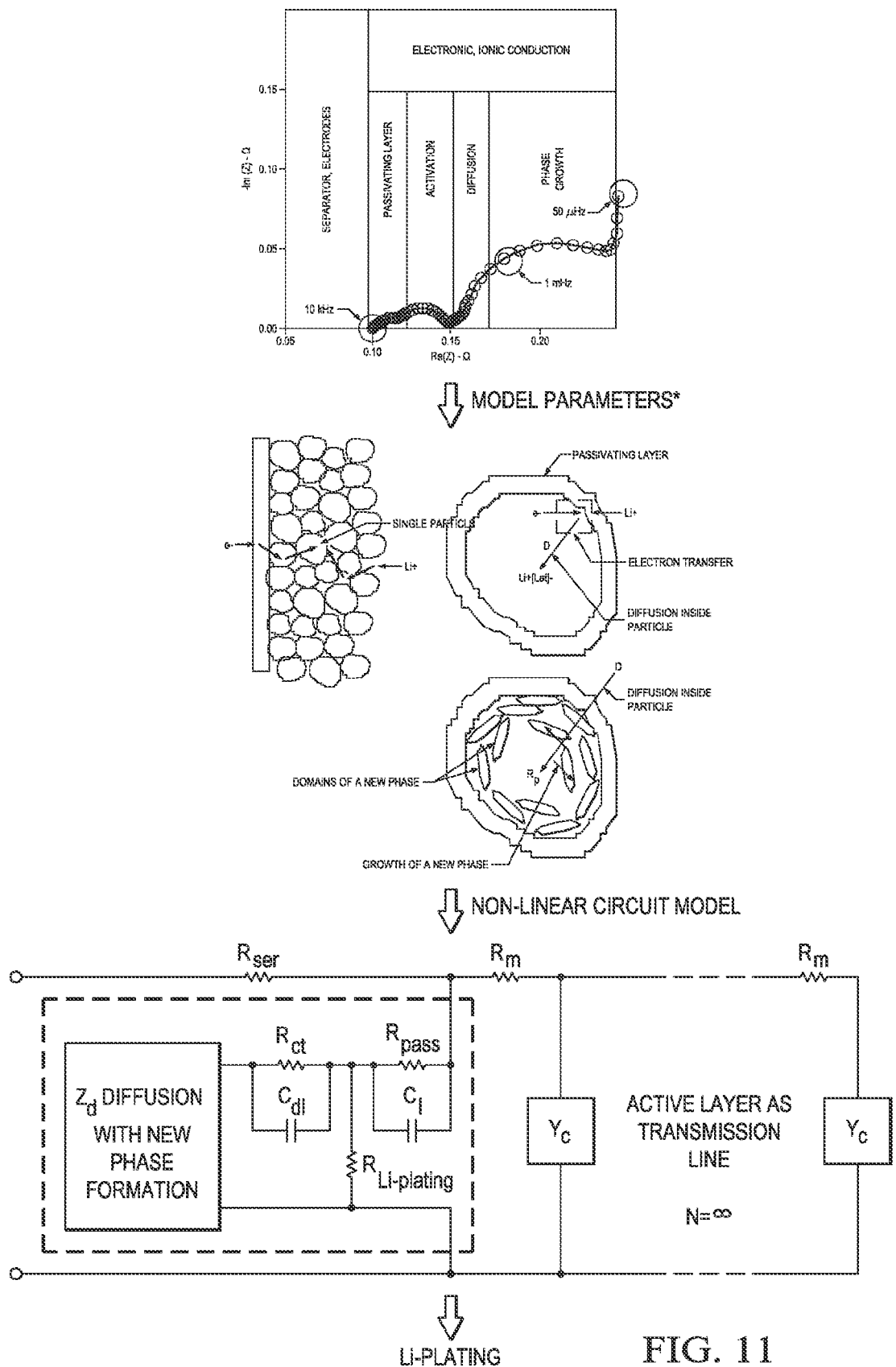
FIG. 11 illustrates Li-plating modeling based on impedance spectroscopy information.
Figure 12A:
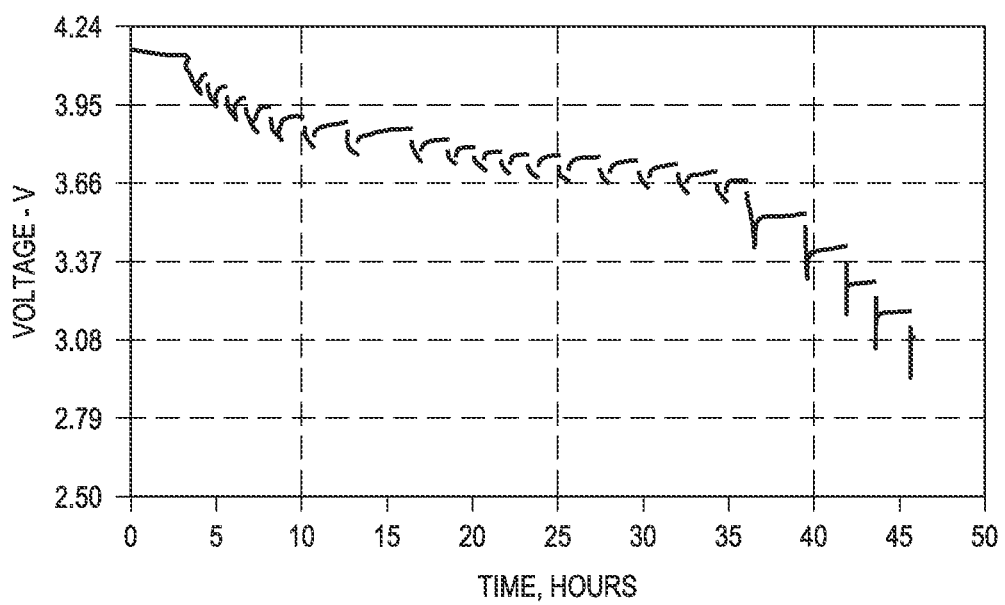
FIG. 12A, FIG. 12B, FIG. 12C, and FIG. 12D illustrate a pulse-relaxing profile to obtain OCV and impedance spectra information.
Figure 12B:
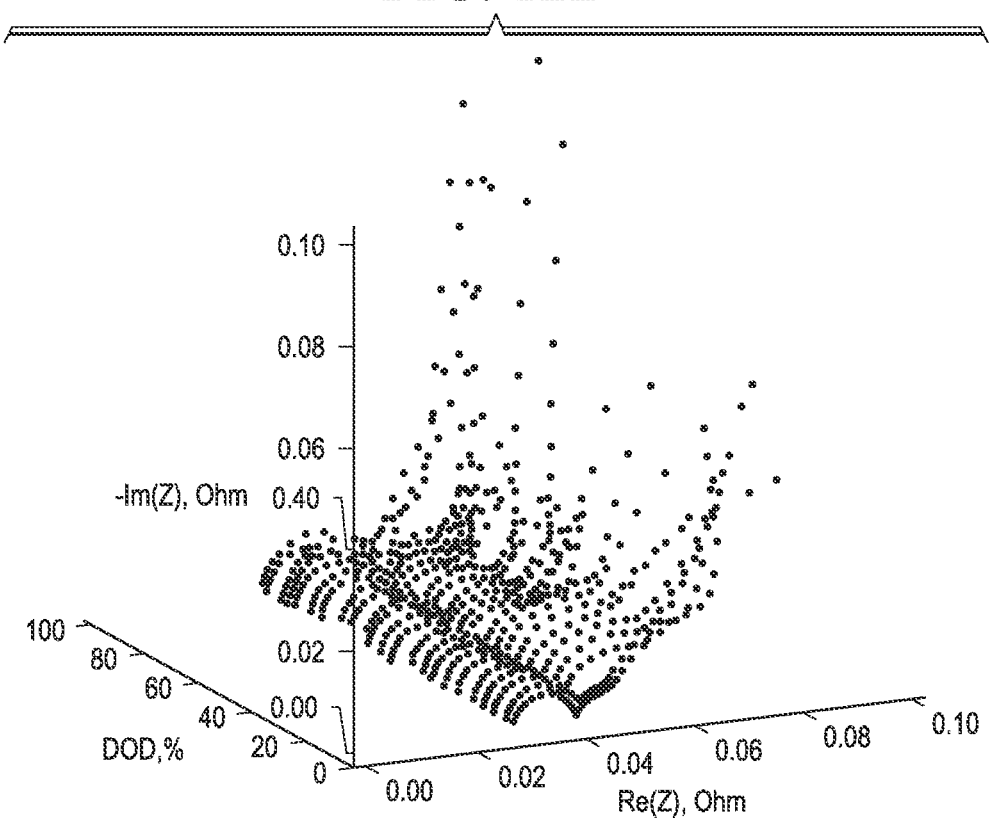
Figure 12C:
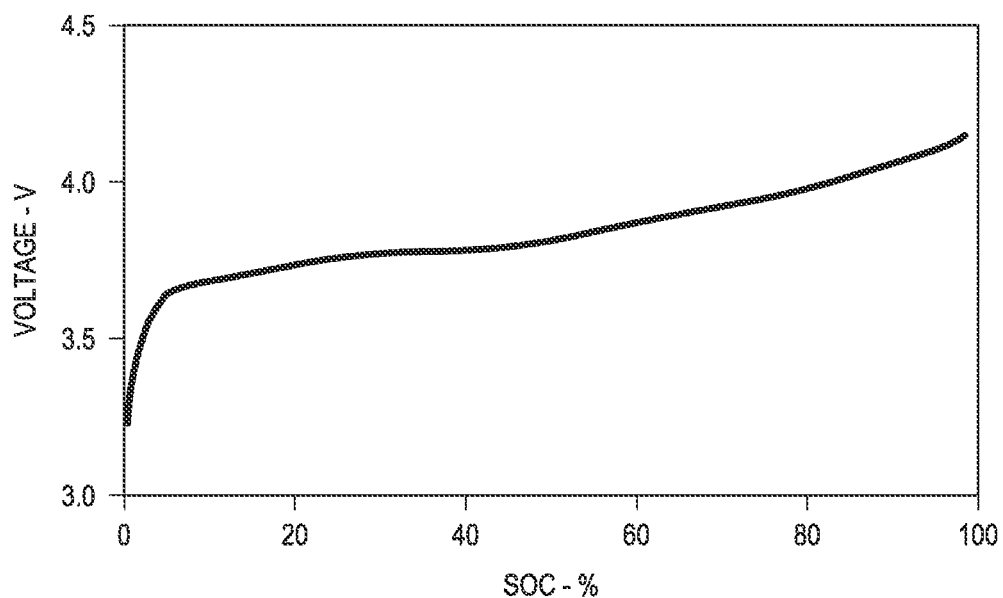
Figure 12D:
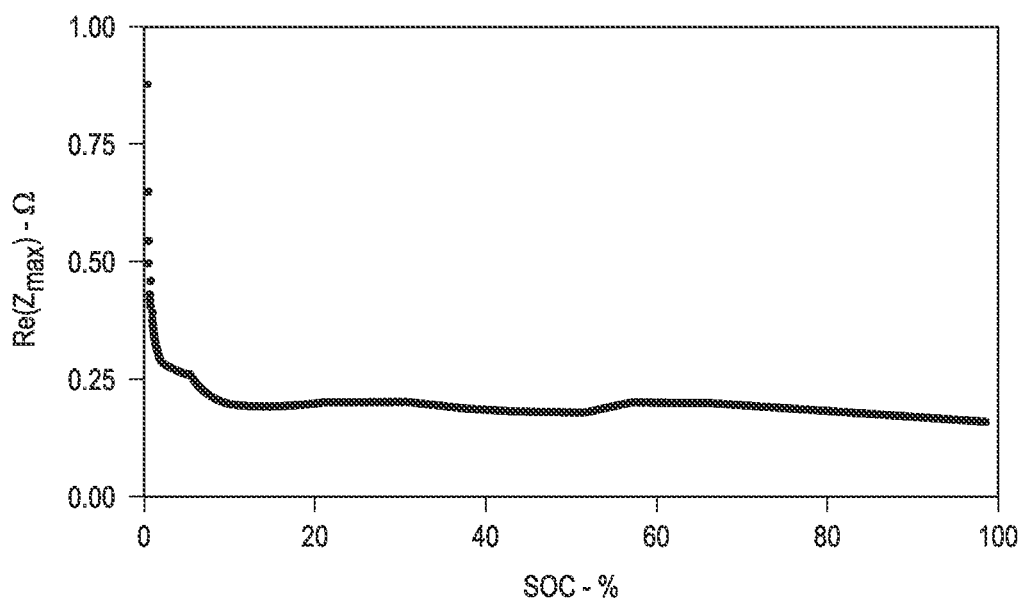

Referring to FIG. 11, there is shown Li-plating modeling based on impedance spectroscopy information. All information relevant to Li-deposition is contained in the impedance spectrum. The model fit allows obtaining the parameters. Advantageously, non-linear circuit modeling allows prediction of the Li-plating rate for any charging condition.

The present invention provides charging voltage and temperature modeling to prevent Li-plating. An open circuit voltage (OCV) and impedance based model takes into account transient effects. Model parameters are obtained from a chemical ID database. A gauge adjusts capacity and impedance parameters with battery aging. Thermal modeling is used, as well as modeling of discharge and charge profiles.

Figure 13:
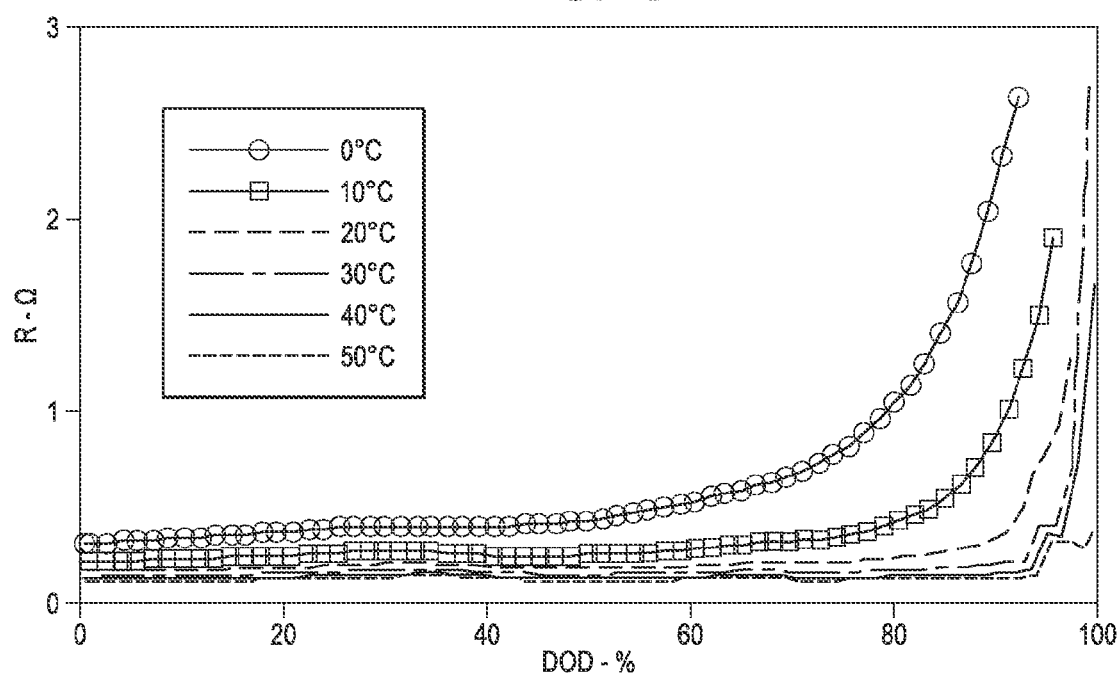
FIG. 13 illustrates low frequency impedance dependent on temperature and depth of discharge (DOD)

FIG. 12A, FIG. 12B, FIG. 12C and FIG. 12D illustrate pulse-relaxation profiles used to obtain OCV and impedance information. FIG. 13 illustrates that impedance is dependent on battery temperature and depth of discharge (DOD). Limiting impedance is strongly dependent on temperature in both value and profile shape. The pulse-relaxation profiles are acquired at different temperatures to provide a temperature dependence database.

Figure 14:
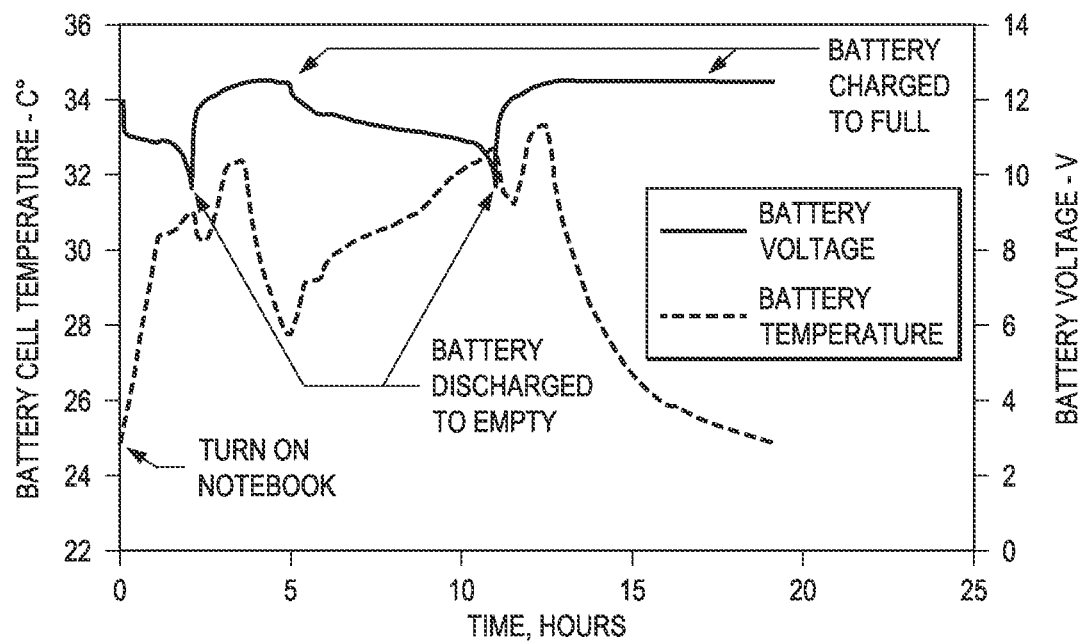
FIG. 14 a temperature profile for run-time prediction.

Knowledge of a temperature profile is needed for run-time or charge-time prediction. FIG. 14 illustrates a battery cell temperature during a notebook operation. As shown, significant changes of temperature occur during device operation. Impedance changes about 1.5 times at 10 degree C. change. To predict runtime, knowledge of the resistance/temperature dependence is not enough. The future temperature profile has to be known or calculated.

Figure 15:
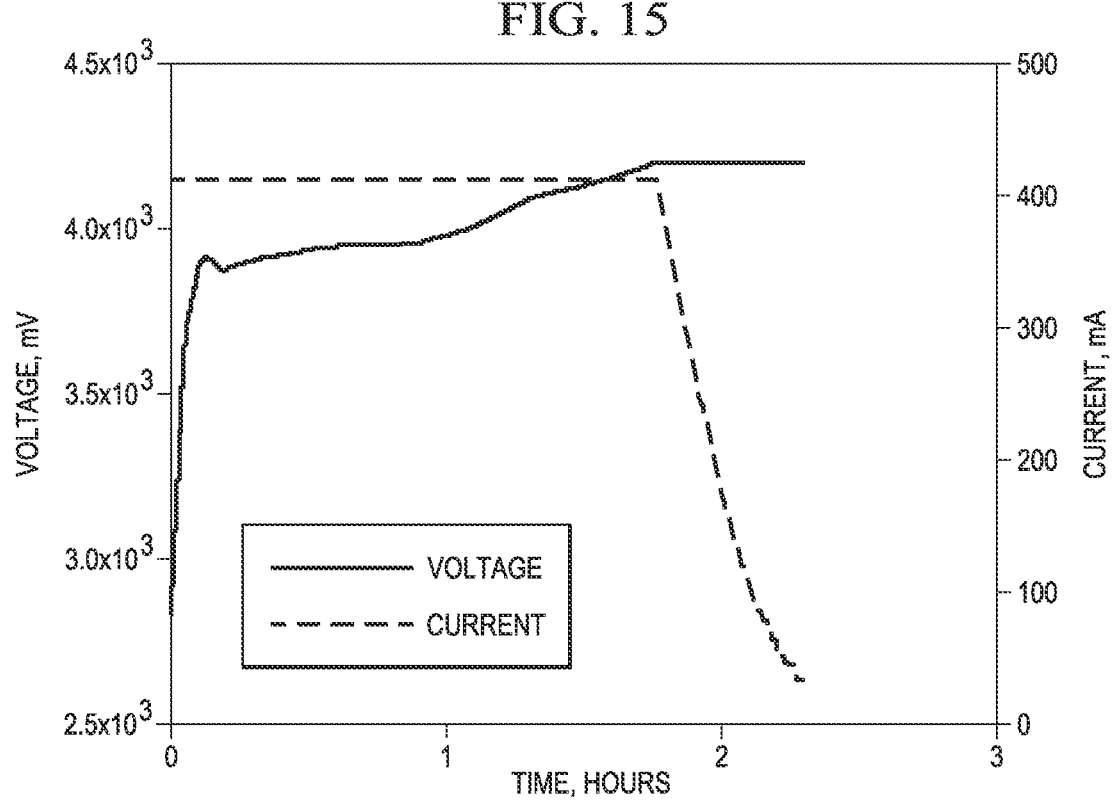
FIG. 15 and FIG. 16 illustrate voltage and temperature modeling for CC/CV charging.
Figure 16:
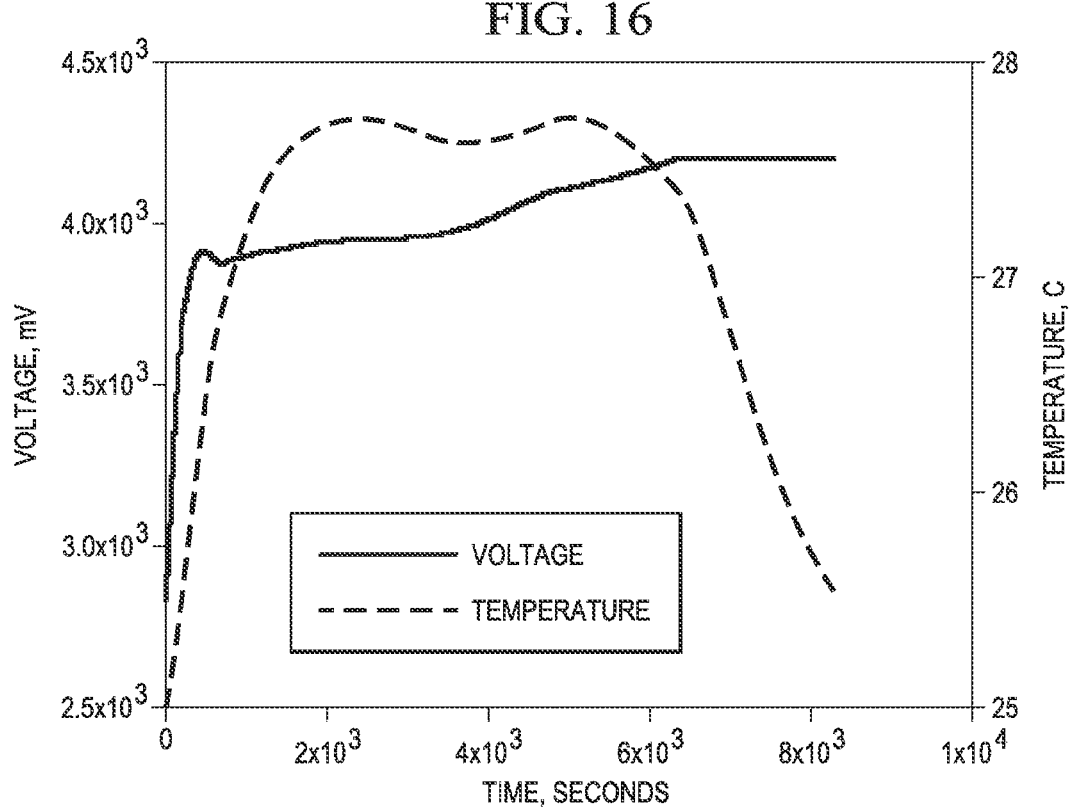

FIG. 15 and FIG. 16 show the voltage and temperature modeling for constant current/constant voltage (CC/CV) charging. FIG. 15 shows voltage and current with respect to time, and FIG. 16 shows voltage and temperature with respect to time for a 0.5 C CC charge rate and a 4.2V CV threshold.

Figure 17:
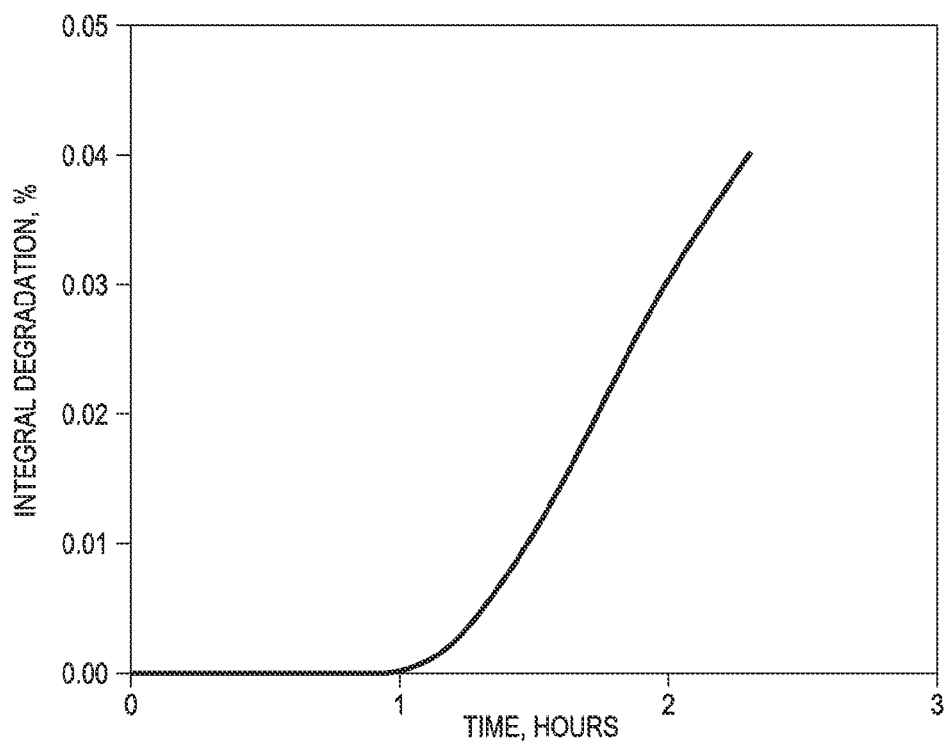
FIG. 17 and FIG. 18 illustrate degradation rate and integral degradation modeling using both modeled voltage and temperature.
Figure 18:
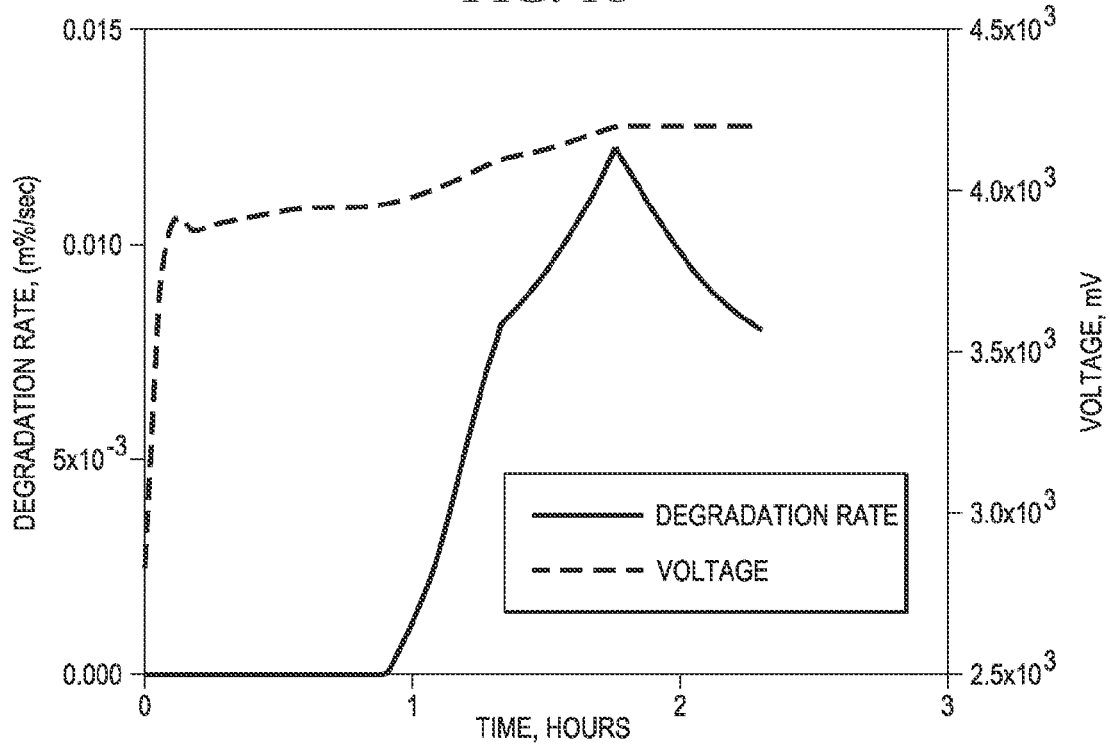

By combining all the modeling together, the present invention advantageously provides battery degradation modeling using modeled voltage and temperature. FIG. 17 shows the % of integral degradation as a function of time, and FIG. 18 shows the degradation rate and battery voltage with respect to time.

FIGS. 19A, 19B, 19C and 19D illustrate adding the effect of Li-plating at high charge rates.

Figure 20:
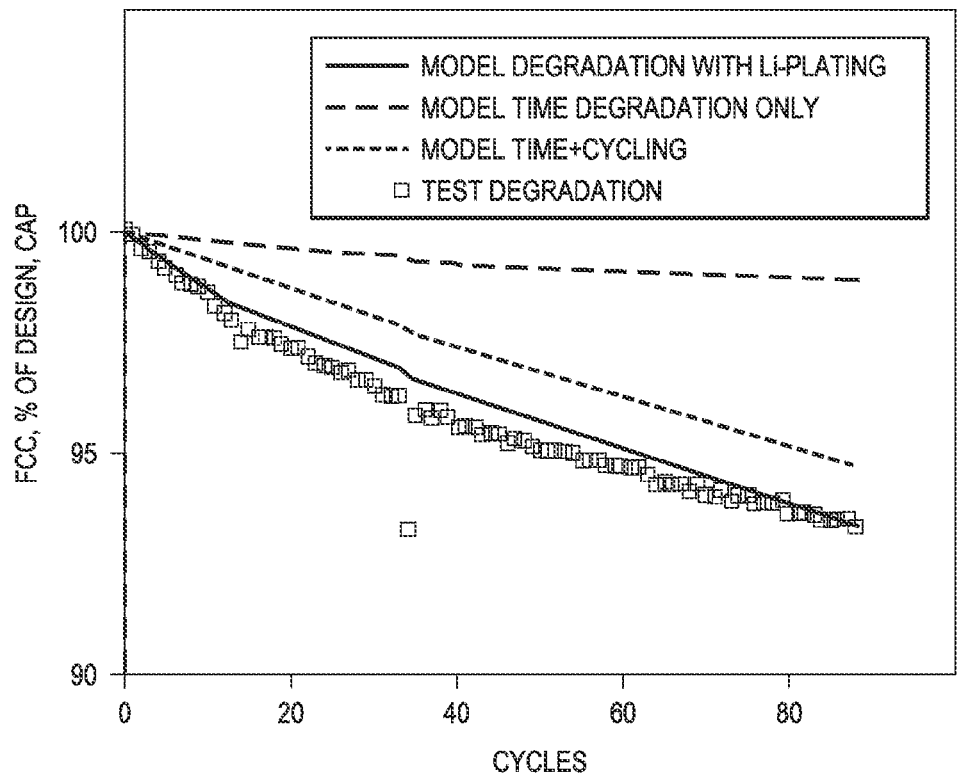
FIG. 20 illustrates Li-plating modeling compared with experimental data.
Figure 19A:
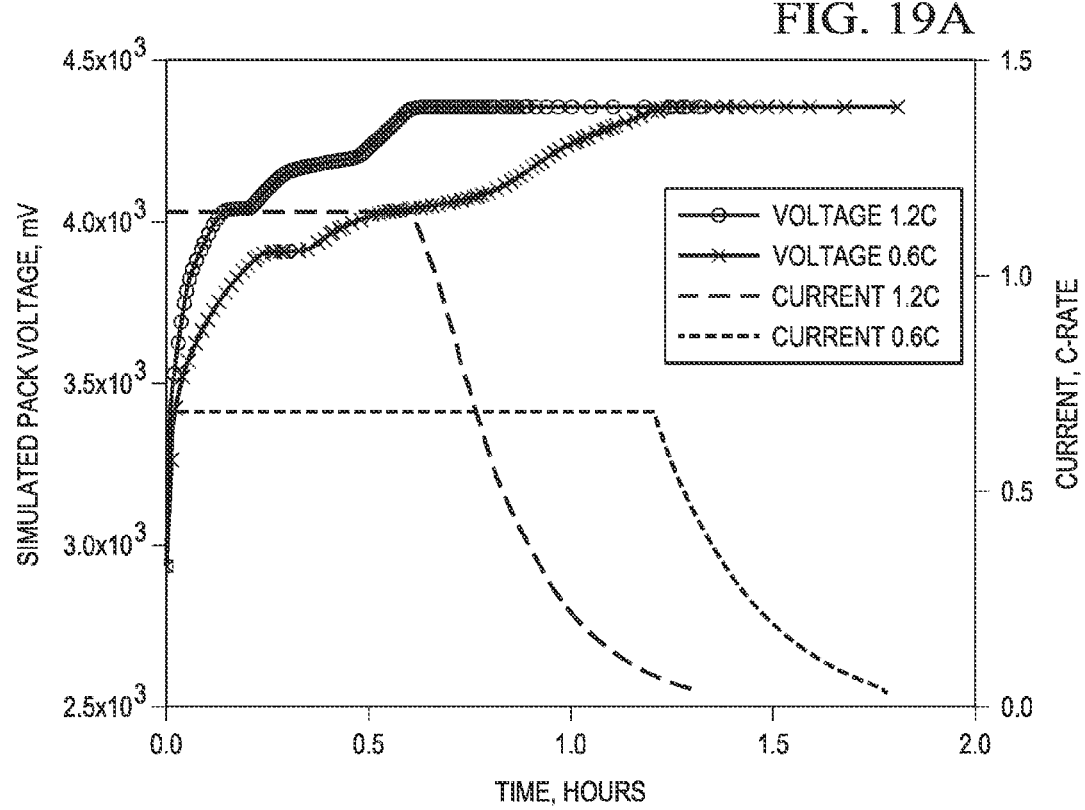
FIGS. 19A, 19B, 19C and 19D illustrate the effect of Li-plating at high charge rates in comparison with normal rate charging.
Figure 19B:
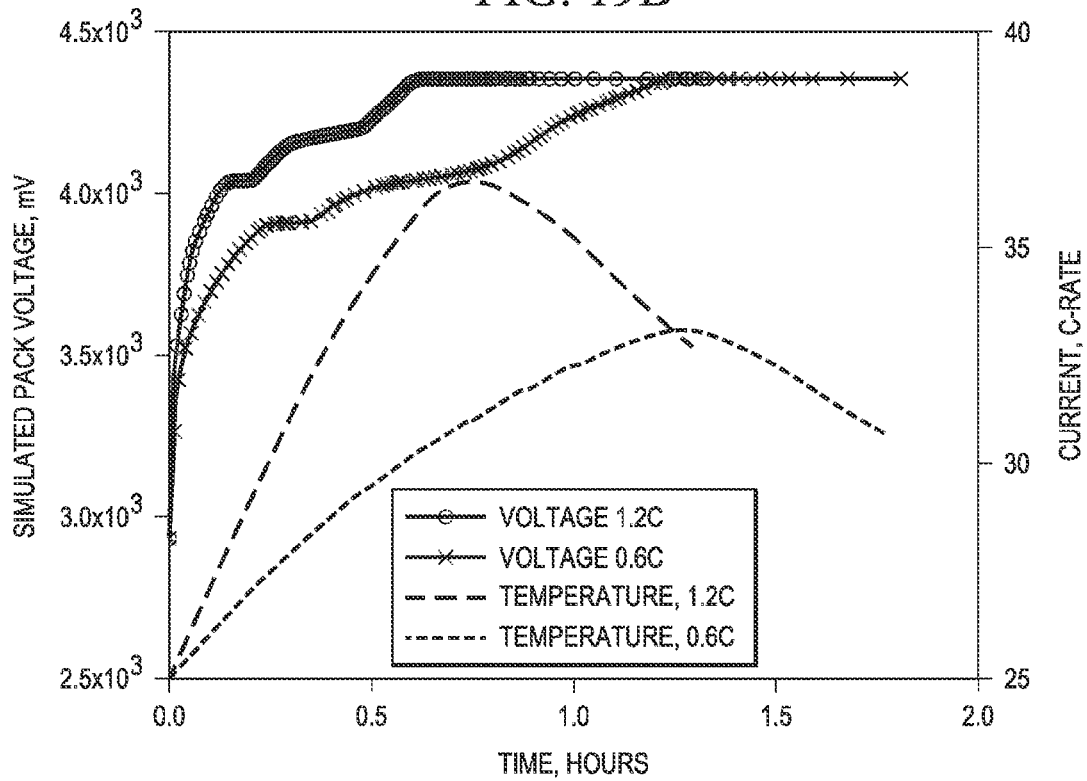
Figure 19C:
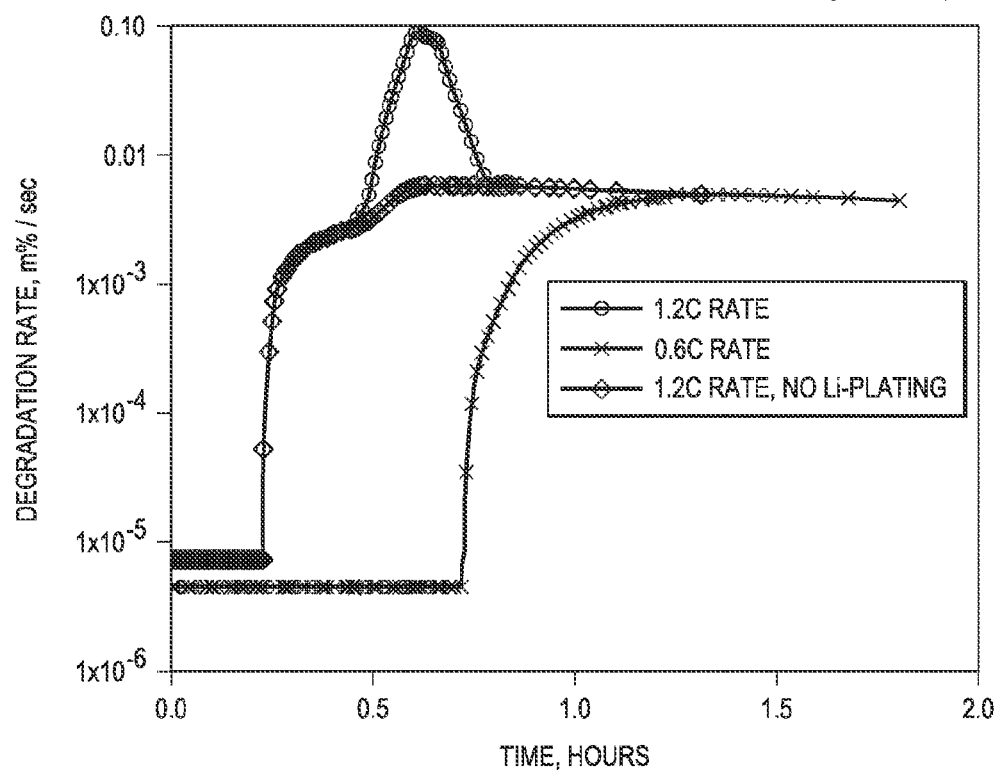
Figure 19D:
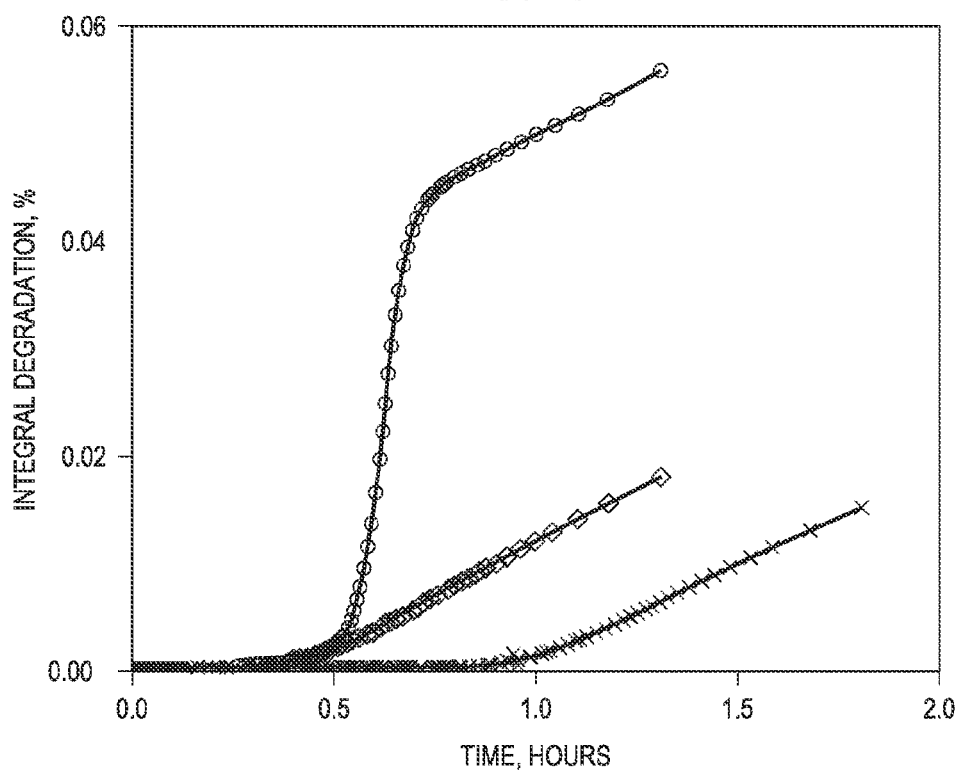
Figure 21A:
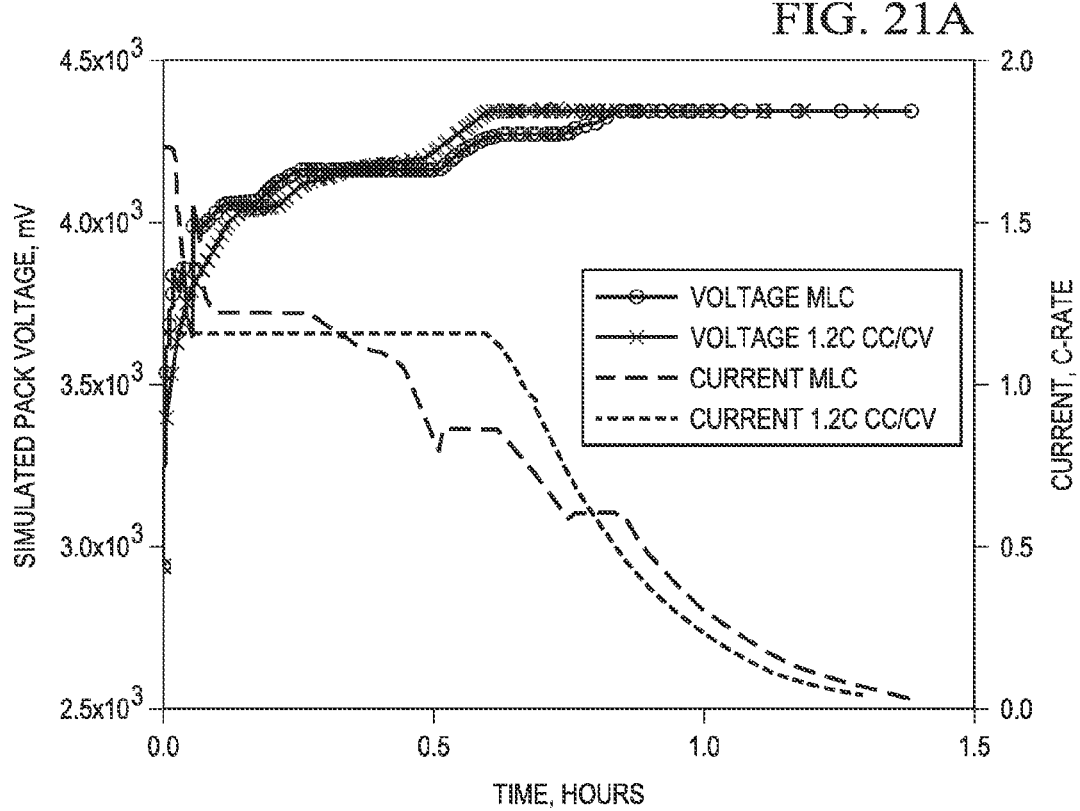
FIGS. 21A, 21B, 21C and 21D illustrate degradation modeling that considers Li-plating to minimize degradation for reduced charge time.
Figure 21B:
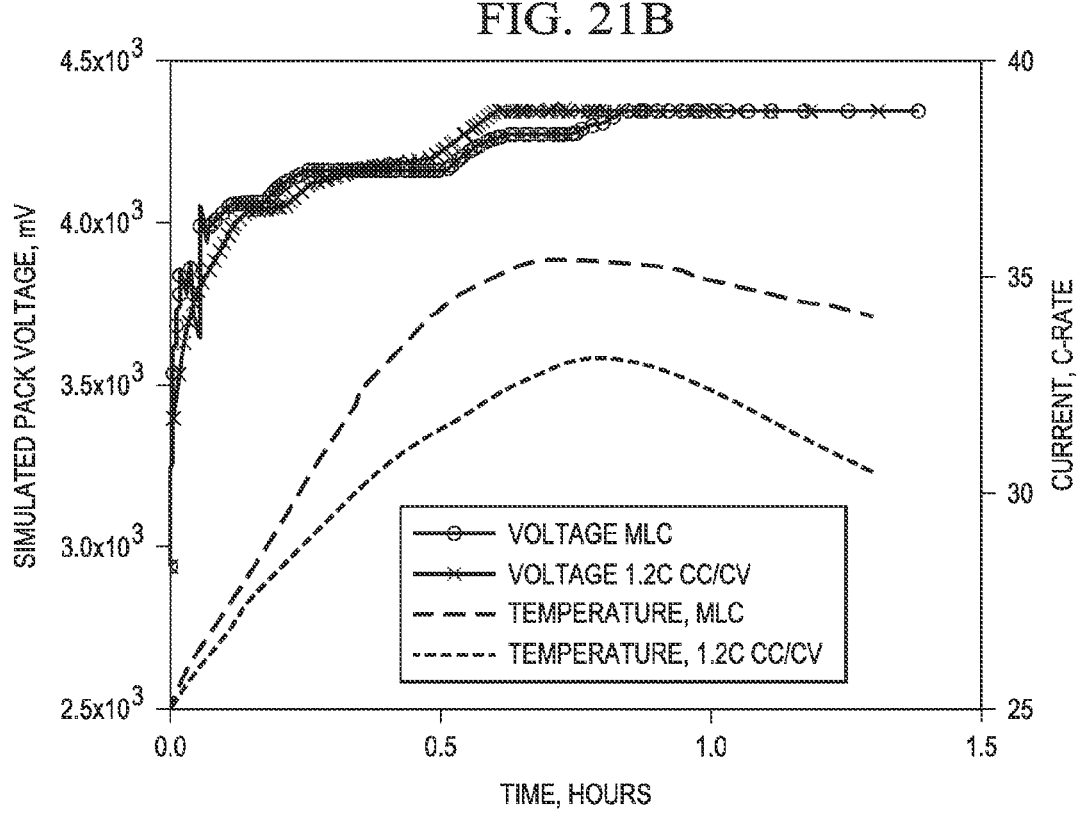
Figure 21C:
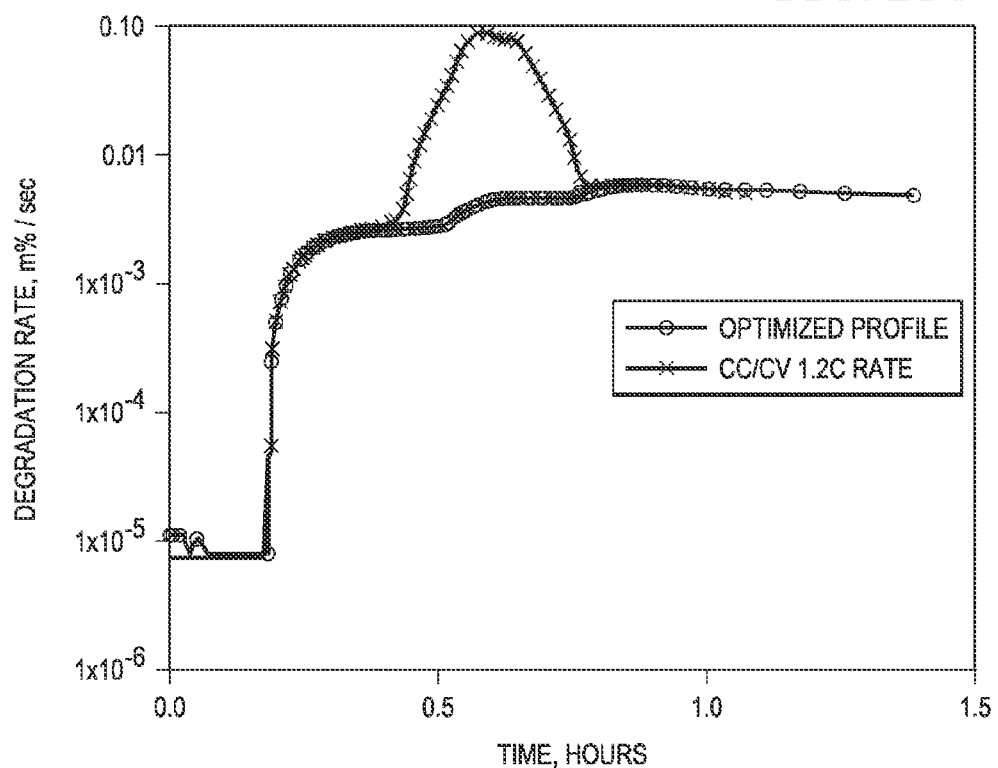
Figure 21D:
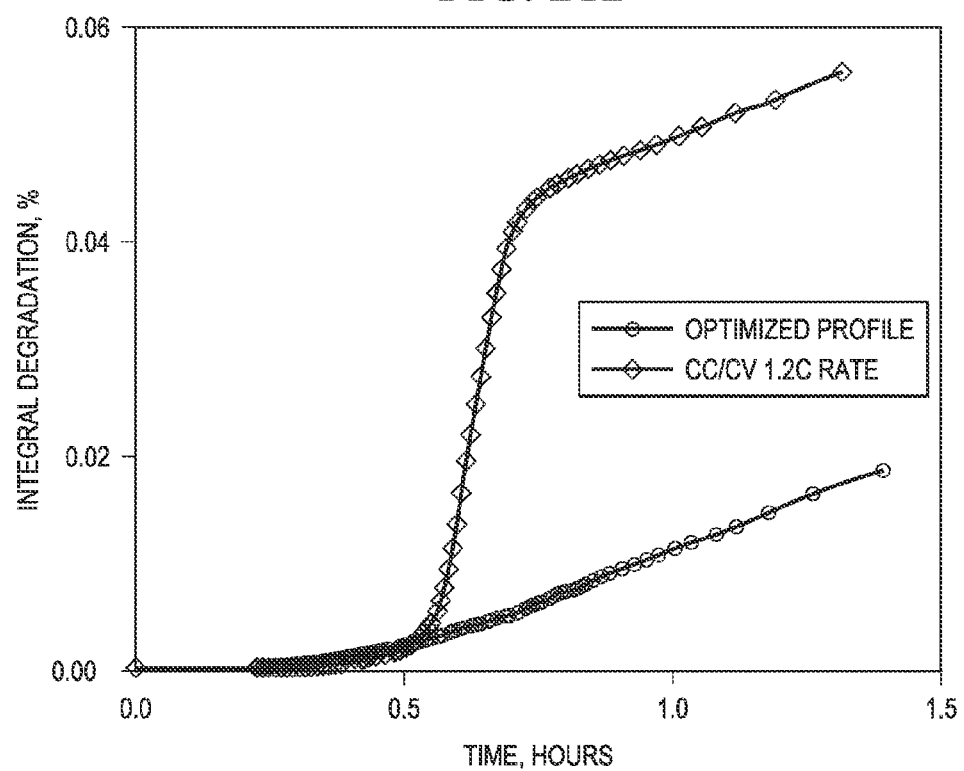

FIG. 20 illustrates the Li-plating model compared to experimental data. It can be seen that battery degradation increases with the C-rate. The temperature increase alone cannot account for the degradation increase. The model that accounts for Li-plating in addition to temperature correctly describes the degradation increase compared to low rate charging. The invention provides optimization of a battery charging profile for minimal degradation. The invention provides the ability to combine voltage and temperature modeling with degradation modeling for arbitrary charging profile allows finding an optimal charge profile for a given battery. As an example, a 5 level CC/CV profile is supported by a controller is optimized.

FIGS. 21A, 21B, 21C and 21D illustrate the degradation modeling that considers Li-plating and allows minimizing degradation for reduced charge time of 1.5 hrs.

Optimization can be performed for a constant charging time, or for a target degradation rate. The optimized parameters are specific to each cell type due to differences in cell properties. A large database is maintained of different cells for an algorithm that allows performing optimization without any additional testing for most cells.

Figure 22A:
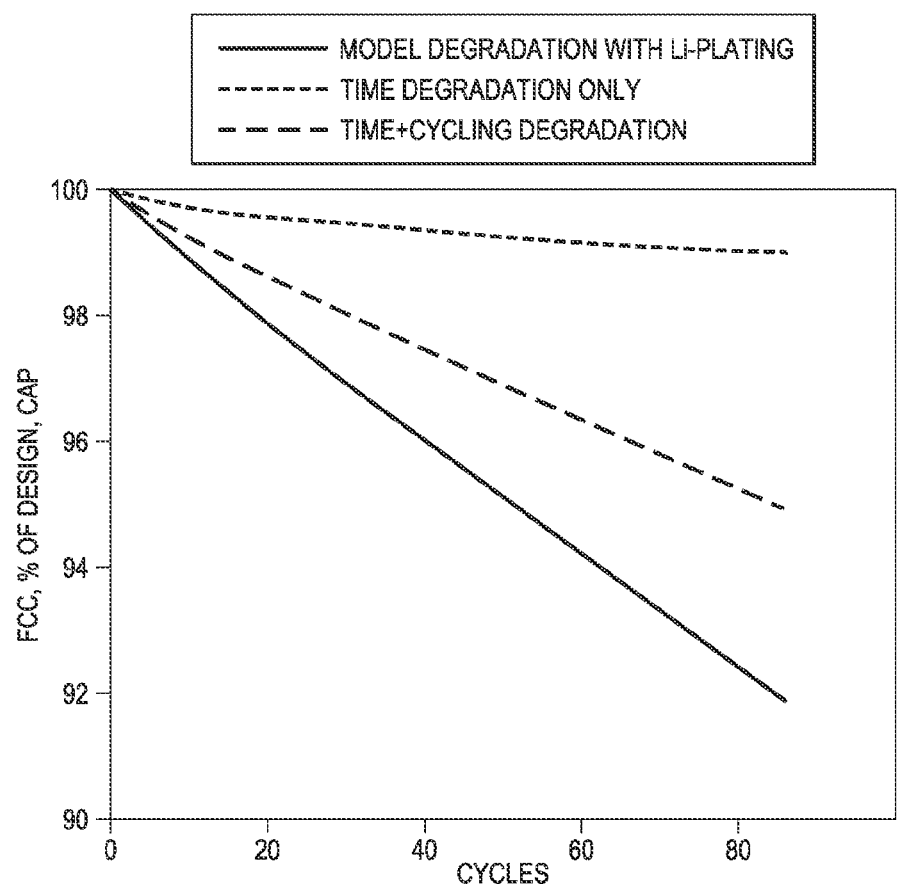
FIG. 22A and FIG. 22B illustrate the improvement in 100 cycles degradation for 1.5 hr. charging.
Figure 22B:
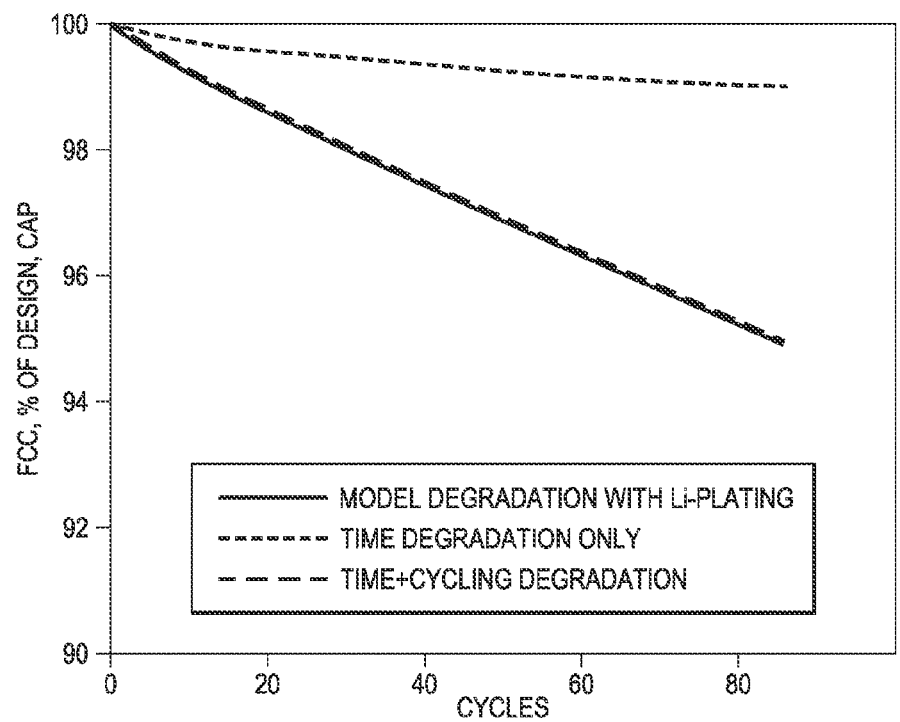

FIGS. 22A and 22B illustrate the improvement in 100 cycles degradation, comparing the CC/CV approach vs. the optimized MLC profile according to the invention. The modeling is showing that battery degradation is significantly reduced after 100 cycles by using the optimized profile of the invention.

Figure 23:
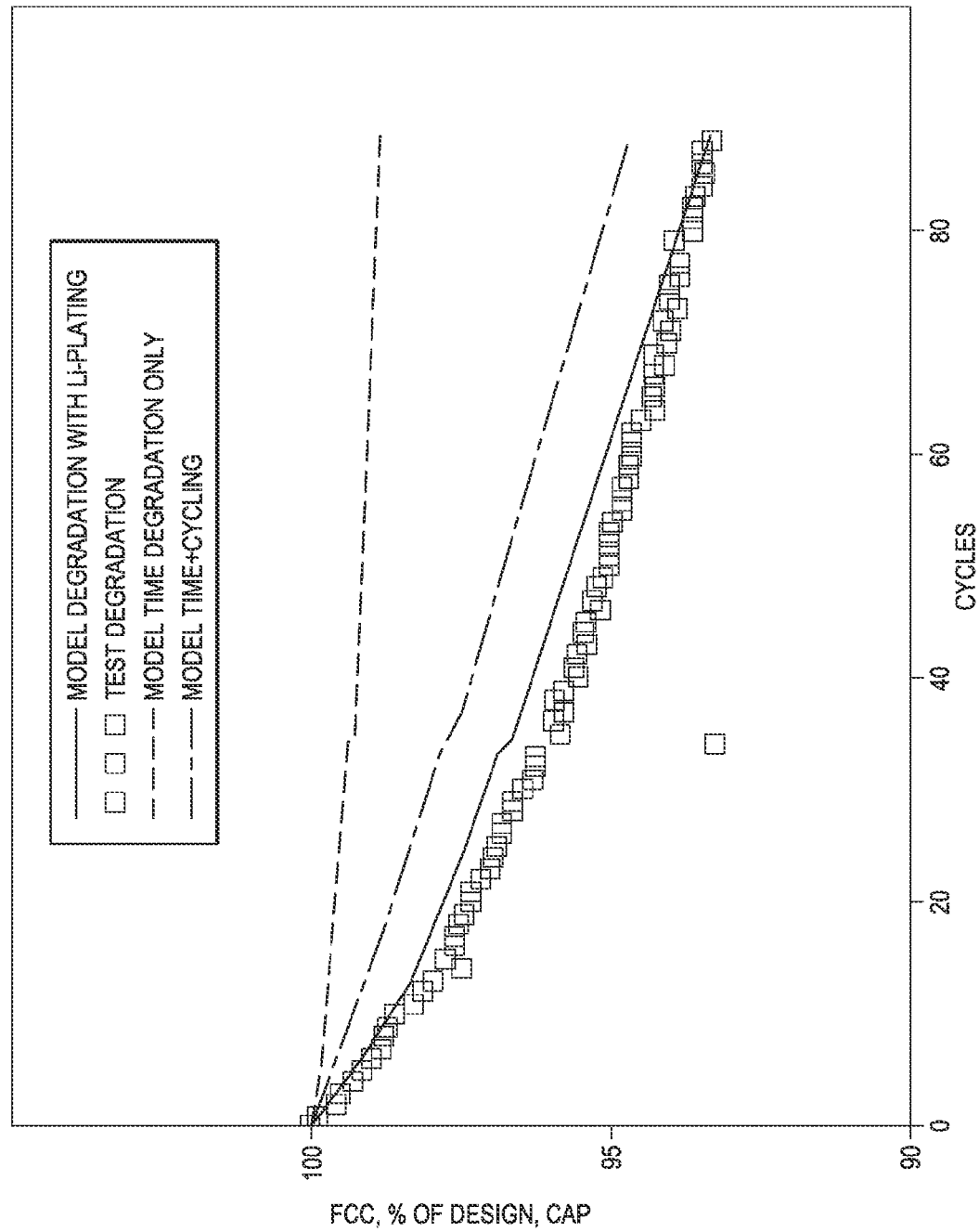
FIG. 23 illustrates simulated degradation with and without Li-plating, compared to experimental data of high rate charging degradation.
Figure 24:
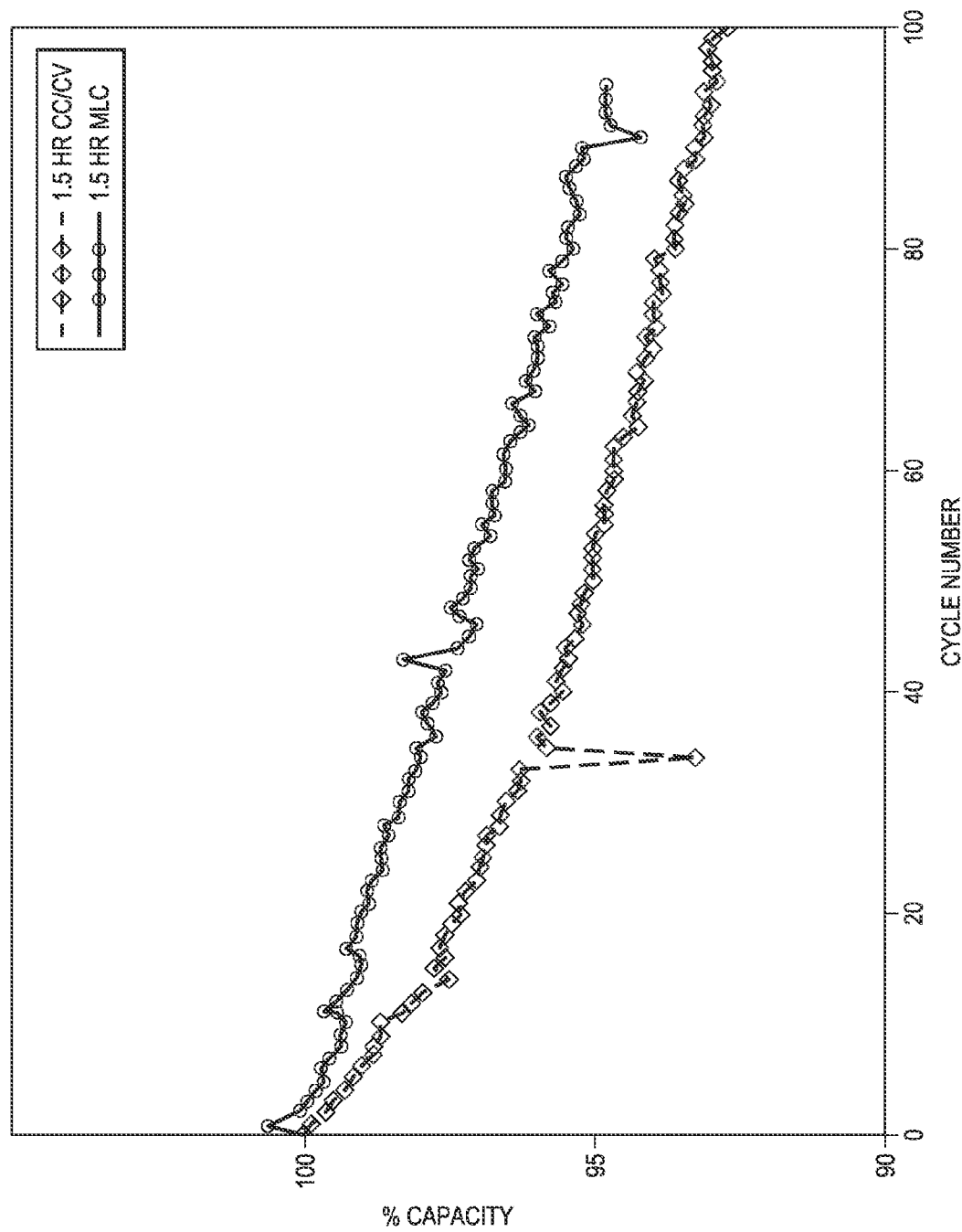
FIG. 24 illustrates actual test data using CC/CV and optimized profile (MLC), both achieving 1.5 hr full charge time.

FIG. 23 and FIG. 24 illustrate CCCV vs. MLC test results, where FIG. 23 illustrates simulated battery degradation with Li-plating removed, and FIG. 24 illustrates actual test results using a MLC profile compared to CC/CV.

Figure 25:
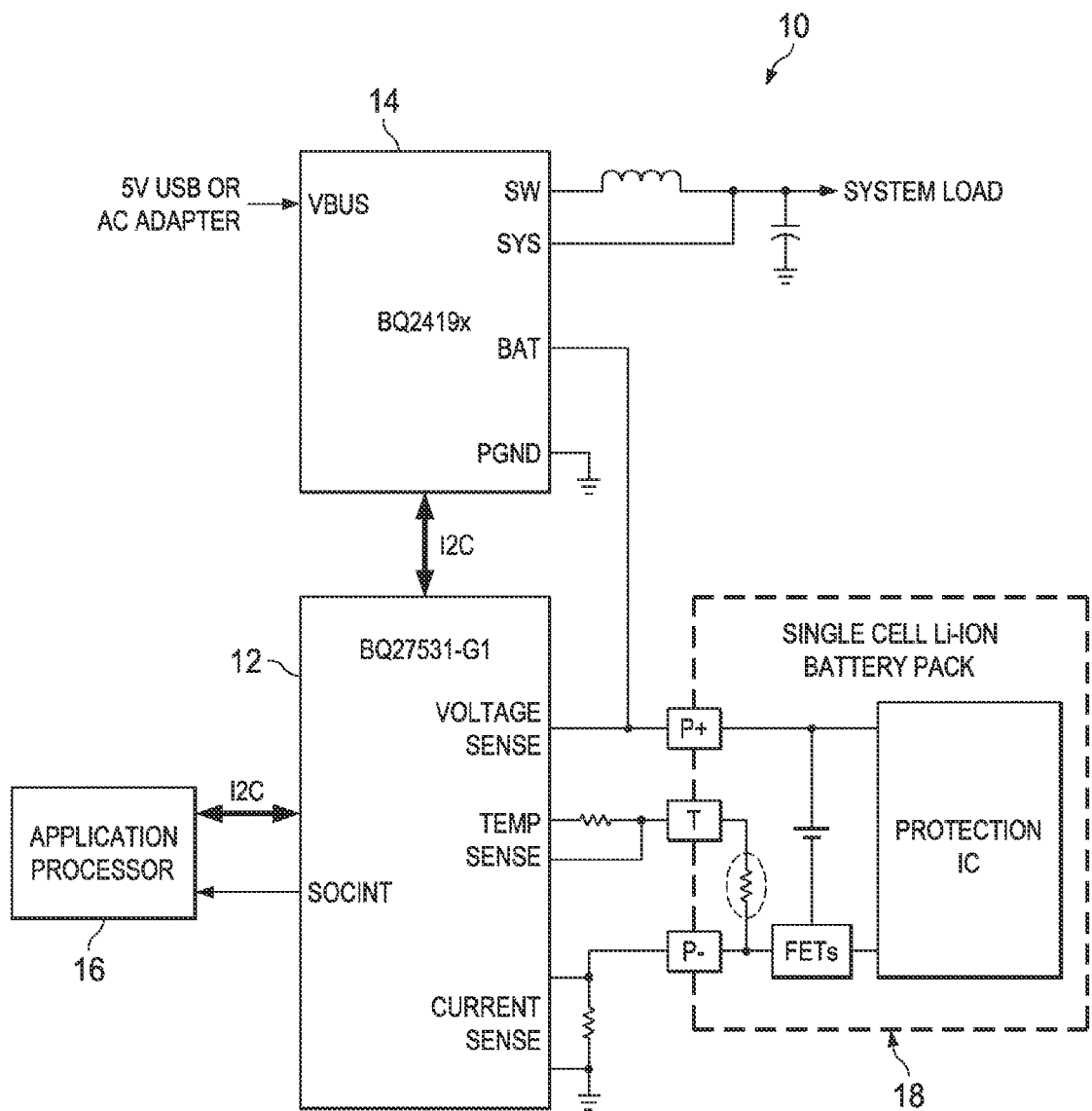
FIG. 25 illustrates a gauge and charging system implementing the health-optimized fast-charging method.

FIG. 25 illustrates a battery fuel gauge and charger system 10 implementing the health-optimized fast charge method of the invention previously described and shown. The gauge is a controller shown at 12 and is coupled to and controls a charger shown at 14. Gauge 12 and charger 14 together comprise an integrated circuit (IC) chipset, and may be configured as a single IC if desired. Gauge 12 communicates with and is responsive to an application processor shown at 16. The gauge 12 is seen to comprise a plurality of sensing inputs responsive to battery 18 providing actual battery voltage, battery current, and a battery temperature as described. The battery fuel gauge 12 and charger 14 in this example reside on a system main board. The board contains the battery fuel gauging system 10 that monitors battery voltage, current and temperature and determines state of charge and state of degradation of the battery 18. System 10 may provide to battery 18, for example, the MLC charge profile as 5 configurable CC/CV charging levels that are modified to achieve optimal charging of the battery 18 for given temperature and age conditions. This data may be communicated to the charger 14 over an I2C interface.

System 10 is configured to facilitate charging of battery 18. System 10 includes gauge controller 12 configured to control battery charger 14 for charging a selected battery 18. The controller 12 is configured to process a plurality of charging profile parameters to determine the MLC battery charging profile configured to control the battery charger and charge the battery. The battery charging profile is configured to minimize degradation of the selected battery 18 for a given charge time. The minimization is achieved using the battery degradation modeling data indicative of a battery degradation rate of the selected battery, and the voltage and temperature response modeling data indicative of predicted battery voltage and temperature of the selected battery as a function of time and charging current.

The system charging profile parameters may be pre-computed prior to use of the system 10, and may be computed within the system. The system controller 12 is configured to be responsive to a received battery temperature measurement to control the battery charging profile. The system controller is configured to utilize a battery depth of discharge measurement to control the charging profile. The charging profile parameters are a function of a present battery degradation level. The present battery degradation level may be determined by an impedance measurement performed on the selected battery 18. The present battery degradation level may determined by a chemical capacity measurement performed on the selected battery.

The system battery degradation modeling data includes data indicative of predicted degradation of the selected battery 18 with charge/discharge cycling. The battery degradation modeling data is a function of battery voltage, battery temperature, battery current, battery depth of discharge, and predicted temperature of the selected battery as a function of being charged according to the battery charging profile. The battery degradation modeling data comprises predicted impedance of the selected battery 18 as a function of battery aging wherein the predicted impedance is a function of battery temperature and the depth of discharge of the selected battery. The system voltage and temperature response modeling data is obtained from impedance spectra of the selected battery 18.

The battery charging profile may be configured to establish a charging current approaching, but below, a value that would cause onset of active material plating effects of the selected battery 18 as a function of the present battery temperature and battery depth of discharge. The battery degradation modeling data includes predicted active material plating effects of the selected battery 18 as a function of charging current rates, temperature and state of charge. The active material plating effects of the selected battery are modeled using parameters obtained from impedance spectra of the selected battery. The active material plating effects of the selected battery are modeled using a non-linear equivalent circuit of the selected battery.

The selected battery may preferably be a Lithium ion type battery, and the battery degradation modeling data is indicative of Lithium plating effects on the selected battery as a function of charge current rate, state of charge (SOC), battery temperature or battery age. The battery charging profile is non-linear, and may comprise a plurality of CC/CV profiles.

The charging parameters are a function of a cell type of the selected battery. The system comprises memory comprising a plurality of battery charging profiles for different battery ages and temperatures in case they are pre-computed, or memory containing battery aging rates and voltage/temperature modeling parameters needed to perform the computation.

In summary, the invention comprises a sophisticated battery degradation modeling system that considers all significant factors of degradation.

The battery voltage and temperature response modeling system is suitable in a gas-gauging system.

The invention advantageously combines voltage and temperature modeling with degradation modeling for arbitrary charging profile allows finding an optimal charge profile for a given battery. The modeling has a self-updating ability, wherein charging profile parameters for a given battery are adjusted with battery aging according to battery impedance increase.

At high charge rates, Li-plating becomes important degradation factor. The impedance based Li-plating modeling allows predicting the plating rate for a particular battery according to charge rate, SOC, temperature and age.

The MLC profile optimized with Li-plating consideration is capable to reduce 100 cycles degradation by 30% in 1.5 hr fast charging case.

Due to a self-updating ability of the algorithm, charging profile parameters are adjusted with battery aging according to battery impedance increase.

A chipset including a gas-gauge and charger allows health-optimized fast charging with currents such as to 4.5 A, while removing the need for host-based charge control.

The following definitions apply to certain words and phrases used throughout this patent document: the term "on" means in direct contact with, while the term "over" encompasses either "on" or separated by one or more intervening materials; the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for other words and phrases are provided throughout this patent document; those of ordinary skill in the art should understand that in many if not most instances, such definitions apply to prior as well as future uses of such defined words and phrases.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A system configured to facilitate charging of a battery, comprising:

a controller configured to control a battery charger for charging a selected battery, the controller configured to process a plurality of charging profile parameters to determine a battery charging profile configured to control the battery charger;

wherein the battery charging profile is configured to minimize degradation of the selected battery for a given charge time, wherein a minimization is achieved through battery degradation modeling data indicative of a battery degradation rate of the selected battery, and voltage and temperature response modeling data indicative of predicted battery voltage and temperature of the selected battery as a function of time and charging current.

2. The system as specified in claim 1 wherein the controller is configured to be responsive to a received battery temperature measurement to control the battery charging profile.

3. The system as specified in claim 1 wherein the controller is configured to utilize a battery depth of discharge measurement to control the battery charging profile.

4. The system as specified in claim 1 wherein the charging profile parameters are a function of a present battery degradation level.

5. The system as specified in claim 4 wherein the present battery degradation level is determined by an impedance measurement performed on the selected battery.

6. The system as specified in claim 4 wherein the present battery degradation level is determined by a chemical capacity measurement performed on the selected battery.

7. The system as specified in claim 1 wherein the battery degradation modeling data includes data indicative of a predicted degradation of the selected battery with charge/discharge cycling.

8. The system as specified in claim 7 wherein the battery degradation modeling data is a function of battery voltage.

9. The system as specified in claim 7 wherein the battery degradation modeling data is a function of battery temperature.

10. The system as specified in claim 7 wherein the battery degradation modeling data is a function of battery current.

11. The system as specified in claim 7 wherein the battery degradation modeling data is a function of battery depth of discharge.

12. The system as specified in claim 8 wherein the battery degradation modeling data is a function of predicted temperature of the selected battery as a function of being charged according to the battery charging profile.

13. The system as specified in claim 1 wherein the battery degradation modeling data comprises predicted impedance of the selected battery as a function of battery aging.

14. The system as specified in claim 13 wherein the predicted impedance is a function of battery temperature and a depth of discharge of the selected battery.

15. The system as specified in claim 13 wherein the voltage and temperature response modeling data is obtained from impedance spectra of the selected battery.

16. The system as specified in claim 1 wherein the battery charging profile is configured to establish a charging current approaching but below a value that would cause onset of active material plating effects of the selected battery as a function of present battery temperature and battery depth of discharge.

17. The system as specified in claim 1 wherein the battery degradation modeling data includes predicted active material plating effects of the selected battery as a function of charging current rate, temperature and state of charge.

18. The system as specified in claim 17, where active material plating effects of the selected battery are modeled using parameters obtained from impedance spectra of the selected battery.

19. The system as specified in claim 17, where active material plating effects of the selected battery are modeled using a non-linear equivalent circuit of the selected battery.

20. The system as specified in claim 1 wherein the selected battery is a Lithium ion type battery, and the battery degradation modeling data is indicative of Lithium plating effects on the selected battery as a function of charge current rate, state of charge, battery temperature or battery age.

21. The system as specified in claim 1 wherein the battery charging profile is non-linear.

22. The system as specified in claim 1 wherein the battery charging profile comprises a plurality of CC/CV (constant current/constant voltage) profiles.

23. The system as specified in claim 1 wherein the parameters are a function of a cell type of the selected battery.

24. The system as specified in claim 1 wherein the system comprises memory comprising a plurality of battery charging profiles.

25. The system as specified in claim 1 further comprising a battery charger responsively coupled to the controller.

26. A system configured to facilitate charging of a battery, comprising:
   a controller configured to control a battery charger for charging a selected battery, the controller configured to process a plurality of charging profile parameters to determine a battery charging profile configured to control the battery charger;
   wherein the battery charging profile is configured to minimize degradation of the selected battery for a given charge time, wherein a minimization is achieved through battery degradation modeling data indicative of a battery degradation level of the selected battery, and voltage and temperature response modeling data indicative of predicted battery voltage and temperature of the selected battery as a function of time and charging current;
   wherein the battery degradation modeling data is a function of battery voltage, battery temperature, battery current, battery depth of discharge, predicted impedance of the selected battery as a function of battery aging, predicted temperature of the selected battery as a function of being charged according to the battery charging profile, wherein the battery charging profile is configured to establish a charging current approaching but below a value that would cause onset of material plating effects of the selected battery.

27. A method charging of a battery, comprising:
   a controller controlling a battery charger for charging a selected battery, the controller configured to process a plurality of charging profile parameters to determine a battery charging profile configured to control the battery charger;
   wherein the battery charging profile minimizes degradation of the selected battery for a given charge time using battery degradation modeling data indicative of a battery degradation rate of the selected battery, and voltage and temperature response modeling data indicative of predicted battery voltage and temperature of the selected battery as a function of time and charging current.

28. The method of claim 27 wherein the battery degradation modeling data is a function of battery voltage, battery temperature, battery current, battery depth of discharge, predicted impedance of the selected battery as a function of battery aging, predicted temperature of the selected battery as a function of being charged according to the battery charging profile, wherein the battery charging profile is configured to establish a charging current approaching but below a value that would cause onset of material plating effects of the selected battery.

\* \* \* \* \*